(12) United States Patent
Bozkurt et al.

(10) Patent No.: US 12,125,639 B2
(45) Date of Patent: **\*Oct. 22, 2024**

(54) CYCLICALLY CHARGEABLE FLEXIBLE SUPERCAPACITOR BATTERY

(71) Applicant: Imam Abdulrahman Bin Faisal University, Dammam (SA)

(72) Inventors: Ayhan Bozkurt, Dammam (SA); Emre Cevik, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/512,552

(22) Filed: Nov. 17, 2023

(65) Prior Publication Data
US 2024/0290554 A1      Aug. 29, 2024

Related U.S. Application Data

(63) Continuation of application No. 18/297,985, filed on Apr. 10, 2023, now Pat. No. 11,854,739, which is a
(Continued)

(51) Int. Cl.
*H01G 11/56*      (2013.01)
*C08J 3/075*      (2006.01)
(Continued)

(52) U.S. Cl.
CPC ............... *H01G 11/56* (2013.01); *C08J 3/075* (2013.01); *H01G 11/26* (2013.01); *H01G 11/32* (2013.01); *C08J 2333/02* (2013.01)

(58) Field of Classification Search
None
See application file for complete search history.

(56) References Cited

U.S. PATENT DOCUMENTS

| 11,328,877 | B2   | 5/2022 | Bozkurt |            |
|------------|------|--------|---------|------------|
| 11,664,174 | B2 * | 5/2023 | Bozkurt | H01G 11/26 |
|            |      |        |         | 361/526    |

(Continued)

FOREIGN PATENT DOCUMENTS

| CN | 110085445 A | 8/2019 |
| CN | 110690062 A | 1/2020 |

(Continued)

OTHER PUBLICATIONS

Yusuf KHAN, et al., "Effect of Charge Density on the Mechanical and Electrochemical Properties of Poly (acrylic acid) Hydrogel Electrolytes Based Flexible Supercapacitors", Materials Today Communications, vol. 25, No. 21, Dec. 2020, p. 101558 (Abstract only).

(Continued)

*Primary Examiner* — Dion R. Ferguson
(74) *Attorney, Agent, or Firm* — Oblon, McClelland, Maier & Neustadt, L.L.P.

(57) ABSTRACT

A flexible energy storage device with a redox-active polymer hydrogel electrolyte is provided. The flexible energy storage device can include a pair of electrodes separated by the redox-active polymer hydrogel electrolyte. The redox-active polymer hydrogel electrolyte can include a polymer hydrogel, charge balancing anions and redox-active transition metal cations at least one selected from the group consisting of vanadium, chromium, manganese, cobalt, and copper. The flexible energy storage device may retain greater than 75% of an unbent specific capacitance when bent at an angle of 10° to 170°.

10 Claims, 21 Drawing Sheets

Related U.S. Application Data continuation of application No. 17/373,174, filed on Jul. 12, 2021, now Pat. No. 11,664,174.

(51) Int. Cl.
*H01G 11/26* (2013.01)
*H01G 11/32* (2013.01)

(56) References Cited

U.S. PATENT DOCUMENTS

| | | | |
|---|---|---|---|
| 11,854,739 | B2 * | 12/2023 | Bozkurt ............... H01G 11/32 |
| 2017/0256366 | A1 | 9/2017 | Stucky |
| 2021/0118626 | A1 | 4/2021 | Bozku |

FOREIGN PATENT DOCUMENTS

| | | |
|---|---|---|
| CN | 111725002 A | 9/2020 |
| CN | 112533997 A | 3/2021 |
| WO | WO 2019/018259 A1 | 1/2019 |
| WO | WO 2021/007670 A1 | 1/2021 |
| WO | WO 2021/062081 A1 | 4/2021 |

OTHER PUBLICATIONS

Sahar Saad Shar, et al., "Molybdate incorporated poly(acrylic acid) electrolytes for use in quasi-solid state carbon based supercapacitors: Redox-active polychelates", Electrochimica Acta, vol. 354, Sep. 10, 2020, p. 136770 (Abstract only).

Yunzhou Guo, et al., "A self-healable and easily recyclable supramolecular hydrogel electrolyte for flexible supercapacitors" Journal of Materials Chemistry A, vol. 4, No. 22, Jun. 2016, pp. 8769-8776.

Anirban Maitra, et al., "Triboelectric Nanogenerator Driven Self-Charging and Self-Healing Flexible Asymmetric Supercapacitor Power Cell for Direct Power Generation", ACS Applied Materials & Interfaces, vol. 11, No. 5, Jan. 8, 2019, pp. 5022-5036 (Abstract only).

J.S. Shaikh, et al., "CuO-PAA hybrid films: Chemical synthesis and supercapacitor behavior", Applied Surface Science, vol. 257, No. 9, 2011, pp. 4389-4397.

Mark Burgess, et al., "Redox Active Polymers as Soluble Nanomaterials for Energy Storage", Accounts of Chemical Research, vol. 49, No. 11, Sep. 27, 2016, pp. 2649-2657 (Abstract only).

Sujoy Bandyopadhyay, et al., "Redox-active, pyrene-based pristine porous organic polymers for efficient energy storage with exceptional cyclic stability", Chemical Communications, vol. 54, Issue 50, May 8, 2018, pp. 6796-6799.

Mohamad Brza, et al., "Energy Storage Behavior of Lithium-Ion Conducting poly(vinyl alcohol) (PVA): Chitosan(CS)-Based Polymer Blend Electrolyte Membranes: Preparation, Equivalent Circuit Modeling, Ion Transport Parameters, and Dielectric Properties", Membranes, vol. 10, No. 381, Nov. 30, 2020, pp. 1-20.

Emre Cevik, et al., "Redox active polymer metal chelates for use in flexible symmetrical supercapacitors: Cobalt-containing poly(acrylic acid) polymer electrolytes", *Journal of Energy Chemistry*, vol. 55, Apr. 2021, pp. 145-153 (Abstract only).

* cited by examiner

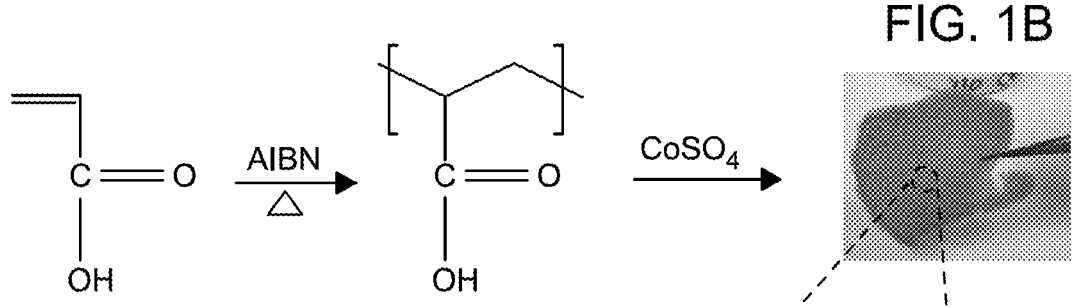
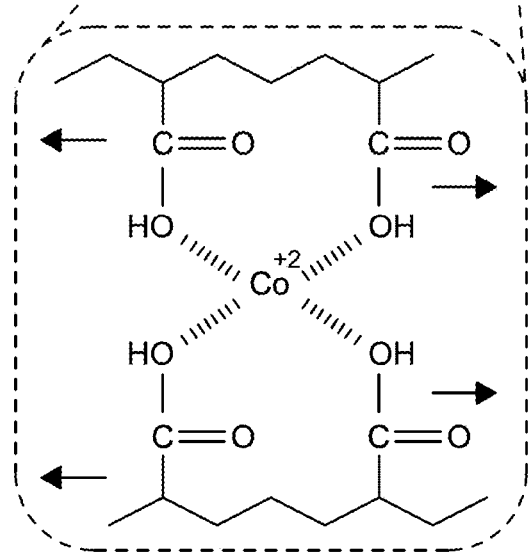
FIG. 1A
FIG. 1B
FIG. 1C

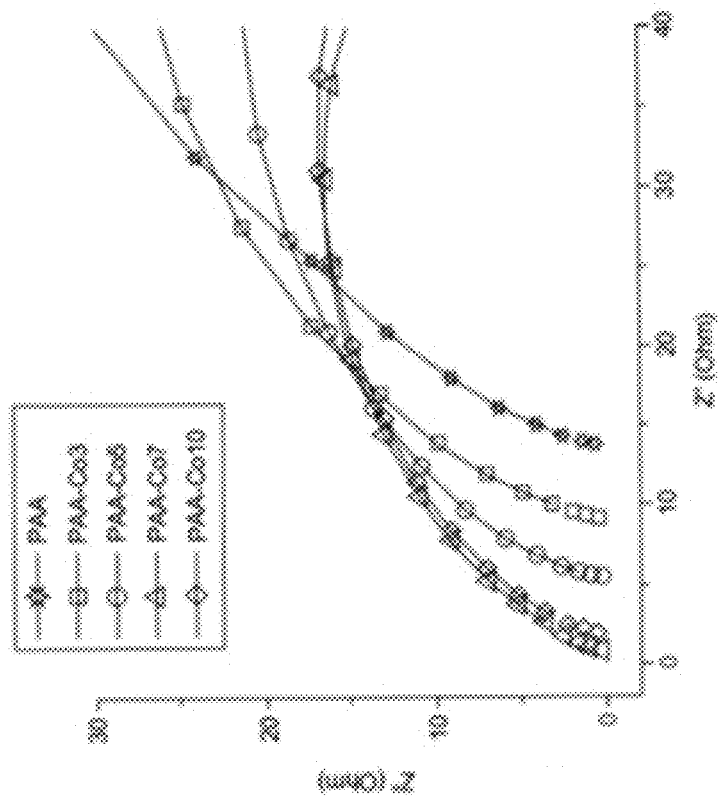
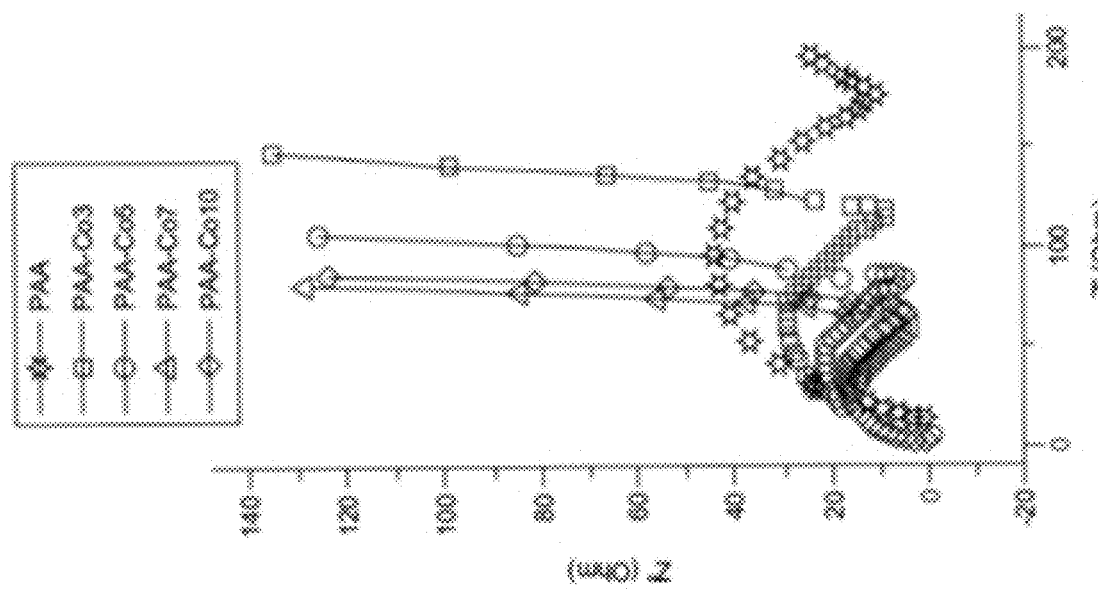
FIG. 3D
FIG. 3C

CYCLICALLY CHARGEABLE FLEXIBLE SUPERCAPACITOR BATTERY

CROSS-REFERENCE TO RELATED APPLICATIONS

The present application is a continuation of U.S. application Ser. No. 18/297,985, now allowed, having a filing date of Apr. 10, 2023, which is a continuation of U.S. application Ser. No. 17/373,174, now U.S. Pat. No. 11,664,174, having a filing date of Jul. 12, 2021.

BACKGROUND OF THE INVENTION

Field of the Invention

The present disclosure relates to flexible energy storage devices. More specifically, the present disclosure relates to supercapacitors including electrodes and a redox-active polymer hydrogel electrolyte. The polymer hydrogel electrolyte contains a polymer hydrogel, charge balancing anions and redox-active transition metal cations.

Discussion of the Background

Energy storage technologies have been developed by introducing flexible energy devices for exceptional use, such as wearable electronic devices and foldable mobile devices. Supercapacitors, inter alia, have garnered a lot of focus owing to exceptional features such as long cycle life, fast charge/discharge, high power density, and environmental compatibility. Generally, liquid electrolytes containing different salts or strong acids have been used in the supercapacitors with various organic solvents such as ethylene carbonate or propylene carbonate. These electrolyte systems have been extensively applied during electric double layer capacitors (EDLC). However, the liquid electrolytes have various disadvantages such as high toxicity, flammability and possible electrolyte leakage that necessitates safe encapsulation, resulting in high cost. To meet such challenges, structural stability electrolytes have been developed. Most importantly, polymer electrolytes with better physical properties such as flexibility and conductivity after doping with ion-conducting species have also been advanced.

While supercapacitors can be manufactured using polymer electrolytes, developing supercapacitors with important properties such as ionic conductivity, temperature stability and electrolytes with electrochemical stability properties is still very challenging. One recent solution to remedy the challenges with the polymer electrolytes is use of redox-mediated systems with high energy and power densities with high-capacitance. However, such systems are expensive to produce, and exhibit several stability drawbacks. Hence, there is a need for development of practical and highly effective, low-cost electrolytes for applications in flexible energy devices.

SUMMARY OF THE INVENTION

The present disclosure relates to a flexible energy storage device, comprising a pair of electrodes separated by the redox-active polymer hydrogel electrolyte. The redox-active polymer hydrogel electrolyte comprises a polymer hydrogel, charge balancing anions, and redox-active transition metal cations. The redox-active transition metal cations are at least one selected from the group consisting of vanadium, chromium, manganese, cobalt, and copper. The flexible energy storage device may retain greater than 75% of an unbent energy storage capacity when bent at an angle of 10 to 170°.

In some embodiments, the polymer hydrogel is a polyacrylic acid hydrogel. In some embodiments, the polyacrylic acid hydrogel is present in an amount of 2.5 to 50 wt. %, based on a total weight of polyacrylic acid hydrogel.

In some embodiments, the redox-active transition metal ions are present in an amount of 0.1 to 15 wt. %, based on a total weight of the redox-active polymer hydrogel electrolyte.

In some embodiments, the redox-active transition metal cations are cobalt (II) ions. In some embodiments, the charge balancing anions are present in an amount of 0.1 to 15 wt. %, based on a total weight of redox-active polymer hydrogel electrolyte.

The flexible storage device may contain the redox-active polymer hydrogel electrolyte substantially free of iron.

In some embodiments, the charge balancing anions are selected from the group consisting of hydroxide anions, halide anions, sulfate anions, nitrate anions, perchlorate anions, tetrafluoroborate anions, difluoro(oxalato)borate anions, hexafluorophosphate anions, and bis(trifluoromethanesulfonyl)imide anions. In some embodiments, the charge balancing anions are sulfate anions.

In some embodiments, the redox-active polymer hydrogel electrolyte has an ionic conductivity of $1.00 \times 10^{-5}$ to $1.00 \times 10^{-3}$ $Scm^{-1}$.

In some embodiments, one or both of the electrodes are carbon electrodes.

In some embodiments, the flexible energy storage device is a supercapacitor, a fuel cell, or a battery. In some embodiments, the device is a supercapacitor having a specific capacitance of 300 to 380 F/g and may have 17 to 25 Wh $kg^{-1}$ at a power density of 100 to 125 W $kg^{-1}$.

The present disclosure also relates to a method of forming the flexible energy storage device, the method comprising: soaking a polymer in a solution comprising the redox-active transition metal cations, the charge balancing anions, and water for 1 to 8 hours to form the redox-active polymer hydrogel electrolyte, disposing the redox-active polymer hydrogel electrolyte on a first electrode such that the redox-active polymer hydrogel electrolyte forms a uniform film covering an entirety of a top surface of the first electrode, and placing onto the redox-active polymer hydrogel electrolyte a second electrode such that the second electrode is separated from the first electrode by the redox-active polymer hydrogel electrolyte to form the flexible energy storage device. In some embodiments the first electrode, the second electrode, or both, are carbon electrodes prepared by uniformly depositing on a metal support a film comprising activated carbon, conductive carbon, and a binder such that an entirety of a top surface of the metal support is individually covered by the film to form a carbon electrode.

The present disclosure also relates to a gel electrolyte, comprising 70 to 99.8 wt. % a polymer hydrogel, 0.1 to 15 wt. % redox-active transition metal ions which are at least one selected from the group consisting of vanadium, chromium, manganese, cobalt, and copper, and 0.1 to 15 wt. % charge-balancing anions which are at least one selected from hydroxide anions, halide anions, sulfate anions, nitrate anions, perchlorate anions, tetrafluoroborate anions, difluoro(oxalato)borate anions, hexafluorophosphate anions, and bis(trifluoromethanesulfonyl)imide anions. In some embodiments, the polymer hydrogel is a polyacrylic acid hydrogel comprising 2.5 to 50 wt. % polyacrylic acid, based on a total weight of polyacrylic acid hydrogel. In some embodiments, the redox-active transition metal ions are cobalt (II) ions and the charge-balancing anions are sulfate anions. In some embodiments, the redox-active polymer hydrogel electrolyte is substantially free of iron.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A shows a representation of the preparation and structure of PAA prepared by a free radical polymerization reaction;

FIG. 1B shows an image of a representative polychelate hydrogel;

FIG. 1C shows a schematic representation of the structure of the polymer metal polychelate;

FIG. 3C illustrates the EIS (Nyquist) plots of PAA and PAA-COX (X=3, 5, 7 and 10 wt %) containing devices obtained in a frequency range of 10 mHz to 100 kHz;

FIG. 3D illustrates the EIS (Nyquist) plots of PAA and PAA-COX (X=3, 5, 7 and 10 wt %) containing devices obtained in a frequency range of 10 mHz to 40 KHz;

DETAILED DESCRIPTION OF THE INVENTION

Figure 1D:
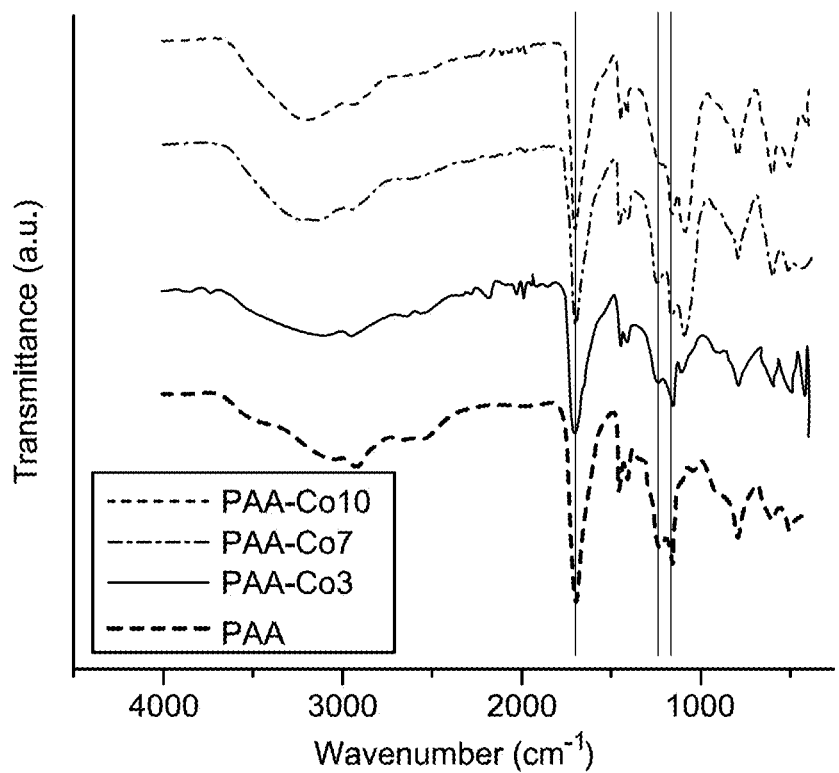
FIG. 1D shows Fourier-transform infrared spectroscopy (FT-IR) spectra of PAA with Co at various weight percentages to produce PAA-COX (X=3, 5, 7 and 10 wt %)

As used herein, the words "a" and "an" and the like carry the meaning of "one or more."

As used herein, the terms "optional" or "optionally" means that the subsequently described event(s) can or cannot occur or the subsequently described component(s) may or may not be present (e.g., 0) wt. %).

The present disclosure is intended to include all hydration states of a given compound or formula, unless otherwise noted or when heating a material. Likewise, hydrogels include all types of hydrogels including polymer, copolymer, homopolymer, temperature-sensitive, thermogels, pH sensitive, electrosensitive, or light-responsive hydrogels.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, isotopes of oxygen include $^{16}O$, $^{17}O$, and $^{18}O$, isotopes of vanadium include $^{50}V$ and $^{51}V$, isotopes of chromium include $^{50}Cr$, $^{52}Cr$, $^{53}Cr$, and $^{54}Cr$, isotopes of manganese include $^{53}Mn$ and $^{55}Mn$, isotopes of cobalt include $^{59}Co$ and $^{60}Co$, and isotopes of copper include $^{63}Cu$ and $^{65}Cu$. Isotopically-labeled compounds of the disclosure may generally be prepared by techniques known to those skilled in the art or by processes analogous to those described herein, using an appropriate isotopically-labeled reagent in place of the non-labeled reagent otherwise employed.

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, even more preferably less than about 0.01 wt. %, even more preferably less than about 0.001 wt. %, yet even more preferably 0 wt. %, relative to a total weight of the composition being discussed.

According to a first aspect, the present disclosure relates to a flexible energy storage device. The flexible energy storage device comprises a pair of electrodes separated by a redox-active polymer hydrogel electrolyte. The redox-active polymer hydrogel electrolyte comprises a polymer hydrogel, charge balancing anions and redox-active transition metal cations at least one selected from the group consisting of vanadium, chromium, manganese, cobalt, and copper.

In some embodiments, the polymer hydrogel is a polyacrylic acid hydrogel. In some embodiments, the polyacrylic acid hydrogel is present in an amount of 2.5 to 98 wt. %, preferably 4.5 to 97.5 wt. %, preferably 4 to 95 wt. %, preferably 5 to 96 wt. %, preferably 6 to 97 wt. %, preferably 7 to 96 wt. %, preferably 8 to 94 wt. %, preferably 9 to 97 wt. %, preferably 10 to 97 wt. %, preferably 50 to 90 wt. %, preferably 52.5 to 85 wt. %, preferably 55 to 82.5 wt. %, preferably 57.5 to 80 wt. %, preferably 60 to 77.5 wt. %, preferably 65 to 75 wt. %, preferably 67.5 to 72.5 wt. % preferably 69 to 70 wt. %, based on a total weight of polyacrylic acid hydrogel. In some embodiments, the polyacrylic acid is a homopolymer. In alternative embodiments, the polyacrylic acid is a copolymer. In general, the copolymer may comprise polyacrylic acid and a secondary polymer, the secondary polymer being any suitable polymer known to one of ordinary skill in the art. Examples of such suitable polymers include, but are not limited to polyethylene, poly(maleic acid), polyacrylamide, polyacrylonitrile, poly(N-vinyl acetamide), polystyrene, poly(2-vinylpyridine), poly(2-acrylamido-2-methylpropanesulfonic acid), polymethacrylates such as poly(benzyl methacrylate), poly (butyl methacrylate), poly(cyclohexyl methacrylate), poly (dodecylmethacrylate), poly(2-ethoxyethyl methacrylate), poly(ethyl methacrylate), poly(hexyl methacrylate), poly(2-hydroxyethyl methacrylate), poly(isobutyl methacrylate), poly(isopropyl methacrylate), poly(methyl methacrylate), poly(octadecyl methacrylate), poly(octyl methacrylate), poly(phenyl methacrylate), poly(propyl methacrylate), and poly(2-chloroethyl methacrylate), and mixtures thereof. In some embodiments in which the polyacrylic acid is a copolymer, the polyacrylic acid is present in an amount of at least 51 wt %, preferably at least 55 wt %, preferably at least 60 wt %, preferably at least 65 wt %, preferably at least 70 wt %, preferably at least 75 wt %, preferably at least 80 wt %, preferably at least 85 wt %, based on a total weight of copolymer.

In some embodiments, the polyacrylic acid is crosslinked using a crosslinker. In general, the crosslinker can be any suitable crosslinker for polyacrylic acid known to one of ordinary skill in the art. Examples of such suitable crosslinkers include, but are not limited to ethylene glycol diacrylate, N,N'-methylenebis(acrylamide), 2,2-bis[4-(2-hydroxy-3-methacryloxypropoxy)phenyl]propane, tetraethylene glycol diacrylate, bis(2-methacryloxyethyl) phosphate, 1,4-bhenylene diacrylate, allyl methacylate, and N,N-diallylacrylamide.

In some embodiments, the redox-active transition metal cations are present in an amount of 0.1 to 15 wt. %, preferably 0.5 to 14 wt. %, preferably 1 to 13 wt. %, preferably 2 to 12.5 wt. %, preferably 3 to 12 wt. %, preferably 4 to 11.5 wt. %, preferably S to 11 wt. %, preferably 2.5 to 10.5 wt. %, preferably 3 to 10 wt. %, based on a total weight of the redox-active polymer hydrogel electrolyte. In some embodiments, the redox-active transition metal cations may include vanadium, chromium, manganese, cobalt, copper, or any combination thereof. In some embodiments, the redox-active polymer hydrogel electrolyte is substantially free of iron.

In some embodiments, the redox-active transition metal cations are preferably coordinated by at least one polyacrylic acid molecule, preferably at least two polyacrylic acid molecules, preferably at least three polyacrylic acid molecules, preferably at least four polyacrylic acid molecules. Such coordination may be through any suitable functional group on the polyacrylic acid molecule, preferably a carboxylic acid group. Such a carboxylic acid group may be protonated (acid form) or deprotonated (carboxylate form). These polyacrylic acid molecules may be present in the inner coordination sphere of the transition metal ions. The polyacrylic acid molecules coordinated to the redox-active transition metal cations may be monodentate or bidentate, tridentate or tetradentate. In general, the rest of the inner coordination sphere of the monoatomic redox-active transition metal cations may be filled by any suitable ligand known to one of ordinary skill in the art. Examples of suitable ligands include species with oxygen-containing functional groups such as alcohols, alkoxides, hydroxides, carboxylic acids and carboxylates, esters, and ethers; species with nitrogen-containing functional groups such as amines (understood here to include ammonia), amides, azides, diimides (also known as azo compounds), imines, porphyrins, imides, isonitriles, nitriles, and nitro compounds; species with phosphorous-containing functional groups such as phosphines, phosphites, phosphates, phosphonites, phosphonates, phosphinites, and phosphinates; species with sulfur-containing functional groups such as thiols, thiolates, disulfides, sulfones, sulfonic acids and sulfonates, sulfoxides, thials, thioesters, thiosulfinates, thiocarboxylic acids and thiocarboxylates, sulfinic acids and sulfinates, thiocyanates, and isothiocyanates; hydrocarbons containing one or more π-electron systems such as mesitylene, cyclopentadienyl anion, and cyclooctadecene; halides; and water. In general, the ligands, may be monodentate, bidentate, tridentate, tetradentate, or pentadentate as appropriate. Hexadentate ligands, however, such as ethylenediamine tetraacetic acid (EDTA) are not suitable as such ligands do not leave an open coordination site for coordination of a polyacrylic acid molecule. In general, the functional groups may occupy any suitable location on a molecule which acts as a ligand. For example, alcohols or amines may be primary alcohols or amines, secondary alcohols or amines, or tertiary alcohols or amines as appropriate.

In preferred embodiments, the redox-active transition metal cations are cobalt (II) ions. In some embodiments, the cobalt ions are monoatomic cobalt ions. In this context, monoatomic refers to single ions coordinated by ligands as described above, distinct from polyatomic ions (e.g. chromate, molybdate, and cobaltate) or clusters of multiple cations bridged by anions such as oxide, hydroxide, and sulfide. In some embodiments, the redox-active transition metal cations are polyatomic cobalt-containing ions. In some embodiments, the cobalt (II) ions form hexa-aqua complex of cobalt (II). In some embodiments, the cobalt (II) ions interact with, are coordinated by, or are associated with at least one, preferably at least two, preferably at least three, preferably at least four functional groups present on polyacrylic acid molecules in the hydrogel. These functional groups may be present on the same polyacrylic acid molecule (e.g. are present on different portions of the same polymer chain) or on different polyacrylic acid molecules (e.g. are present on different polymer chains). Such interaction may be through any suitable mechanism known to one of ordinary skill in the art, for example coordination interactions as described above, electrostatic interactions, physisorption, or any combination thereof. Such interaction may take place in the inner coordination sphere, outer coordination sphere, or both of the redox-active transition metal cation.

In some embodiments, the charge balancing anions are present in an amount of 0.1 to 15 wt. %, preferably 0.5 to 14 wt. %, preferably 1 to 13 wt. %, preferably 2 to 12.5 wt. %, preferably 3 to 12 wt. %, preferably 4 to 11.5 wt. %, preferably 5 to 11 wt. %, preferably 2.5 to 10.5 wt. %, preferably 3 to 10 wt. %, based on a total weight of redox-active polymer hydrogel electrolyte. In general, charge balancing anions may be any suitable anionic substance known to one of ordinary skill in the art. In some embodiments, the charge balancing anions are selected from the group consisting of hydroxide anions, halide anions, sulfate anions, nitrate anions, perchlorate anions, tetrafluoroborate anions, difluoro(oxalato)borate anions, hexafluorophosphate anions, and bis(trifluoromethanesulfonyl)imide anions.

In preferred embodiments, the charge balancing anions are sulfate anions. In preferred embodiments, the sulfate anion is a cobalt (II) sulfate heptahydrate. In some embodiments, the charge balancing anions include polyanionic compounds. In preferred embodiments, the polyanionic compounds are sulfate-based polyanionic compounds. In alternative preferred embodiments, the sulfate-based polyanionic compounds include the sulfate-based polyanionic compounds such as $AMSO_4X$ (A=Li, Na, K; M=Fe, Mn, Ni, Co; X=F, OH) and $Li_2M(SO_4)_2$ (M=Fe, Co, Mn).

In some embodiments, the hydrogel electrolyte may include polymeric additives. In this context, a polymeric additive refers to a polymer added to the gel electrolyte which is not incorporated into the structure of the polyacrylic acid. Such polymeric additives are distinct from a secondary polymer which makes up a copolymer, which are incorporated into the structure of the polyacrylic acid. Examples of such polymeric additives include, but are not limited to polyvinyl alcohol, polyethylene glycol, polyvinyl acetate, polypropylene glycol, polyacrylate, starch, chitosan, collagen, gelatin, fibrin, cellulose, agarose, and alginate.

In some embodiments, the redox-active polymer hydrogel electrolyte has an ionic conductivity of $1.00 \times 10^{-5}$ to $1.00 \times 10^{-3}$, preferably $2.50 \times 10^{-5}$ to $7.50 \times 10^{-4}$, preferably $5.00 \times 10^{-5}$ to $6.50 \times 10^{-4}$, preferably $7.50 \times 10^{-5}$ to $5.50 \times 10^{-4}$, preferably $1.00 \times 10^{-4}$ to $4.50 \times 10^{-4}$, preferably $2.50 \times 10^{-4}$ to $3.75 \times 10^{-4}$ $Scm^{-1}$, preferably $2.60 \times 10^{-4}$ to $3.70 \times 10^{-4}$, preferably $2.70 \times 10^{-4}$ to $3.60 \times 10^{-4}$, preferably $2.80 \times 10^{-4}$ to $3.50 \times 10^{-4}$, preferably $2.90 \times 10^{-4}$ to $3.40 \times 10^{-4}$, preferably $3.00 \times 10^{-4}$ to $3.30 \times 10^{-4}$, preferably $3.10 \times 10^{-4}$ to $3.20 \times 10^{-4}$ $Scm^{-1}$.

In some embodiments, the flexible energy storage device may retain greater than 75%, preferably greater than 77.5%, preferably greater than 80%, preferably greater than 82.5%, preferably greater than 85%, preferably greater than 87.5%, preferably greater than 90%, preferably greater than 92.5%, preferably greater than 95%, preferably greater than 97.5% of an unbent energy storage capacity when bent at an angle of 10 to 170°, preferably 12.5 to 167.5°, preferably 15 to 165°, preferably 17.5 to 162.5°, preferably 20 to 160°, preferably 22.5 to 157.5°, preferably 25 to 155°, preferably 27.5 to 152.5°, preferably 30 to 150°, preferably 35 to 155°, preferably 40 to 160°, preferably 45 to 160°, preferably 50 to 170°.

In general, the flexible energy device may be any suitable energy storage device known to one of ordinary skill in the art. Examples of energy storage devices include a supercapacitor, a fuel cell, and a battery. In some embodiments, the flexible energy storage device is a supercapacitor. In some embodiments, the flexible energy storage device is a fuel cell. In some embodiments, the flexible energy storage device is a battery. In general, the battery may be any suitable type of battery known to one of ordinary skill in the art. In general, the fuel cell may be any suitable type of fuel cell known to one of ordinary skill in the art.

In general, the energy storage capacity of the flexible energy storage device may be any suitable measure of energy storage capacity known to one of ordinary skill in the art. As different types of devices (e.g. supercapacitors, fuel cells, batteries, and the like) store energy in different manners, a different measure may be used to determine the energy storage capacity for different types of devices. For example, for supercapacitors, suitable measures for energy storage capacity include, but are not limited to capacitance, specific capacitance, energy density, power density, specific energy, and specific power. For example, for batteries, suitable measures for energy storage capacity include, but are not limited to capacity, specific energy, power density, and specific power.

In some embodiments, the flexible energy storage device is a supercapacitor. In some embodiments, the supercapacitor has a specific capacitance of 300 to 380 F/g, preferably 310 to 375, preferably 315 to 370, preferably 320 to 365, preferably 325 to 360, preferably 330 to 355, preferably 335 to 350, preferably 340 to 345 F/g. In some embodiments, the supercapacitor has an energy density of 17 to 25 Wh/kg, preferably 18 to 24, preferably 19 to 23.5 preferably 19.5 to 23, preferably 20 to 22.5, preferably 20.5 to 22, preferably 21 to 21.5 Wh/kg. In general, the specific capacitance and/or the energy density may be measured by any suitable method of measuring specific capacitance known to one of ordinary skill in the art. Examples of such suitable techniques include, but are not limited to cyclic voltammetry, galvanostatic discharge, and electrochemical impedance spectroscopy.

The supercapacitor comprises a pair of electrodes separated by the redox-active polymer hydrogel electrolyte as described herein. Such a combination may be referred to as a cell. Based on this terminology, the supercapacitor comprises a minimum of one cell. In some embodiments, the supercapacitor comprises one cell. In alternative embodiments, the supercapacitor comprises more than one cell, for example two cells, three cells, four cells, five cells, six cells, seven cells, eight cells, nine cells, ten cells, or more. The cells may be connected in series, parallel, or a combination of cells connected in series and in parallel.

In general, the electrodes may be any suitable electrodes known to one of ordinary skill in the art. In preferred embodiments, one or both the electrodes are carbon electrodes. In some embodiments, the carbon electrodes comprise conductive carbon. In general, the conductive carbon may be any suitable conductive carbon known to one of ordinary skill in the art. In some embodiments, the conductive carbon has a mean primary particle size of 25 to 75 nm, preferably 30 to 70 nm, preferably 35 to 65 nm, preferably 40 to 60 nm. In some embodiments, the conductive carbon has a BET nitrogen surface area of 50 to 75 m$^2$/g, preferably 55 to 70 m$^2$/g, preferably 60 to 65 m$^2$/g, preferably 61 to 63 m$^2$/g. In some embodiments, the conductive carbon has a density of about 150 to 170 kg/m$^3$, preferably about 1$2.5 to 167.5 kg/m$^3$, preferably about 155 to 165 kg/m$^3$, preferably about 157.5 to 162.5 kg/m$^3$, preferably about 160 kg/m$^3$. In some embodiments, the conductive carbon is present in an amount of 1 to 20 wt. %, preferably 2 to 18 wt. %, preferably 3 to 17 wt. %, preferably 4 to 16 wt. %, preferably 5 to 15 wt. %, preferably 6 to 14 wt. %, preferably 7 to 13 wt. %, preferably 8 to 12 wt. %, preferably 9 to 11 wt. %, preferably 10 wt. %, based on a total weight of the carbon electrode.

In some embodiments, the carbon electrodes comprise activated carbon. In general, the activated carbon may be any suitable activated carbon known to one of ordinary skill in the art. In some embodiments, the activated carbon has a mean primary particle size of 2 to 10 μm, preferably 3 to 9 μm, preferably 4 to 8 μm, preferably 5 to 7 μm. In some embodiments, the activated carbon has a BET surface area of 1250 to 2250 m$^2$/g, preferably 1300 to 2150 m$^2$/g, preferably 1400 to 1950 m$^2$/g, preferably 1500 to 1850 m$^2$/g. In some embodiments, the activated carbon has a density of about 350 to 550 kg/m$^3$, preferably about 375 to 525 kg/m$^3$, preferably about 400 to 500 kg/m$^2$, preferably about 425 to 475 kg/m$^3$, preferably about 450 kg/m$^3$. In some embodiment, the activated carbon is present in an amount of 60 to 98 wt. %, preferably 63 to 96 wt. %, preferably 65 to 94 wt. % preferably 68 to 92 wt. %, preferably 70 to 90 wt. %, preferably 72 to 88 wt. %, preferably 74 to 86 wt. %, preferably 76 to 84 wt. %, preferably 78 to 82 wt. %, preferably 80 wt. %, based on a total weight of the carbon electrode.

In some embodiments, the electrodes comprise a conductive electrode support on which the carbon is disposed. Such a conductive electrode support may also be referred to as a "collection layer" or a "current collector". In some embodiments, the conductive electrode support is a metal support. Examples of metals which may be used in the metal support include, but are not limited to gold, silver, copper, aluminum, platinum, nickel, and titanium. In some embodiments, the metal support is aluminum. In general, the conductive electrode support may be any suitable shape or geometry known to one of ordinary skill in the art. Examples of such shapes or geometries include foils, meshes, foams, porous sheets, and bound aggregates.

In some embodiments, the electrodes comprise a binder. In general, the binder may be any suitable binder known to one of ordinary skill in the art. Examples of binders include, but are not limited to for example, poly(vinylidene difluoride) (PVdF), polytetrafluoroethylene (PTFE), styrene butadiene rubber (SBR), carboxymethyl cellulose (CMC optionally as a salt, e.g., Na, K, Li, or the like), polyacrylic acid, polyethylene glycol (PEG), polyacrylonitrile, polystyrene, polyurethane, polyisoprene, polyethylene, polypropylene, ethylene propylene diene monomer (EPDM) rubber, poly (vinyl butyral), poly(vinyl acetate), poly(butyl acrylate), poly(methyl acrylate), chitosan, alginate, pectin, amylose, xanthan gum, gum arabic, gellan gum, Carrageenan, karaya gum, cellulose, guar gum, Tara gum, Tragacanth gum, gelatin, and caseinate. In some embodiments, the binder is present in an amount of 1 to 20 wt. %, preferably 2 to 18 wt. %, preferably 3 to 17 wt. %, preferably 4 to 16 wt. %, preferably 5 to 15 wt. %, preferably 6 to 14 wt. %, preferably 7 to 13 wt. %, preferably 8 to 12 wt. %, preferably 9 to 11 wt. %, preferably 10 wt. %, based on a total weight of the carbon electrode.

In some embodiments, the flexible energy storage device comprises an electrolyte support. The electrolyte support may be any suitable structure, at least a portion of which is located between the pair of electrodes, which provides a mechanical benefit to the flexible energy storage device, for example, by increasing a flexural stiffness of the device, enhancing mechanical integrity of the hydrogel electrolyte, or preventing loss of the hydrogel electrolyte; and/or which provides an electrical benefit to the flexible energy storage device, for example, by increasing capacitance, increasing an operable temperature range of the energy storage device, or increasing the energy density of the device. In some embodiments, the electrolyte support may maintain or help maintain the flexible energy storage device in a bent state, even in the absence of an external bending force. In alternative embodiments, the electrolyte support may provide a restoring force which restores or helps restore the flexible energy storage device to an unbent state in the absence of an external bending force. In general, the electrolyte support may be placed in any configuration with the hydrogel electrolyte, provided that at least a portion of the electrolyte support is located between the electrodes. For example, the electrolyte support may be disposed between an electrode and the hydrogel electrolyte, be embedded within the hydrogel electrolyte, surround the hydrogel electrolyte, or encompass and penetrate the hydrogel electrolyte such that the hydrogel electrolyte is embedded within the electrolyte support. In general, the electrolyte support may be any suitable shape known to one of ordinary skill in the art. Examples of such suitable shapes include, but are not limited to a mesh, a screen, and a film. In some embodiments, the electrolyte support is non-conductive. In alternative embodiments, the electrolyte support is conductive. In such embodiments, the electrolyte support should not cause a short-circuit or other detrimental electrical behavior of the flexible energy storage device. The electrolyte support may be constructed of any suitable material known to one of ordinary skill in the art. Examples of such suitable materials include, but are not limited to metals such as aluminum, gold, copper, and silver, and polymers. In some embodiments, the electrolyte support comprises an elastomeric material. As the electrolyte support is a separate structure, which may be in contact with but does not form part of the hydrogel which makes up the hydrogel electrolyte, the inclusion of a polymer or polymer-containing electrolyte support layer should not be considered as an inclusion of a polymer in the hydrogel electrolyte.

In some embodiments, the flexible energy storage device may comprise an electrode integration layer. The electrode integration layer is a material disposed between an electrode and the hydrogel electrolyte. The electrode integration layer may be advantageous for providing a mechanical benefit, electrical benefit, or both, as described above. The electrode integration layer may further be advantageous for enhancing contact or contact integrity between the electrode and the hydrogel electrolyte. Such contact or contact integrity may be enhanced in a mechanical sense, for example greater adhesion or adhesion over a wider temperature range; in an electrical sense, for example greater conductivity or providing a material of intermediate conductivity between the electrode and the hydrogel electrolyte; or both. The electrode integration layer may be any suitable material known to one of ordinary skill in the art. In some embodiments, the electrode integration layer is a polymer. In some embodiments, the electrode integration layer is a biopolymer. Examples of biopolymers include cellulose, alginate, chitin, chitosan, collagen, fibrinogen, and polylactic acid.

In some embodiments, the electrolyte support and/or the electrode integration layer comprise surface hydroxyl functional groups. Such surface hydroxyl functional groups may be advantageous for increased contact or integration with the hydrogel electrolyte. Such surface hydroxyl functional groups may be part of the structure of the material of which the electrolyte support and/or electrode integration layer is made up, for example chitosan and cellulose. Alternatively, such surface hydroxyl functional groups may be added via a surface treatment. The surface treatment may convert non-hydroxyl functional groups to hydroxyl functional groups, for example the reduction of carbonyl or carboxyl groups. Alternatively, the surface treatment may add a hydroxyl functional group-containing material to the surface of the electrolyte support and/or electrode integration layer. The hydroxyl functional group-containing material may form chemical bonds to the electrolyte support and/or electrode integration layer such as with hydroxyl-containing silanes, hydroxyl-containing organometallic materials, or hydroxyl-containing metal coordination material. Alternatively, the hydroxyl functional group-containing material may not form chemical bonds with the electrolyte support and or electrode integration layer as in hydroxyl-containing resins or hydroxyl-containing polymer coatings.

In some embodiments, the flexible energy storage device may comprise organic redox-active additives such as quinone compounds, hydroquinone compounds, indole compounds, and halogenated derivatives thereof. Examples of such exclude organic redox-active additives include hydroquinone monomethyl ether, hydroxy acetophenone, hydroxybenzaldehyde, hydroxy benzoic acid, hydroxybenzonitrile, acetaminophen, hydroxybenzyl alcohol, hydroxycinnamic acid, methylparabin, 2,5-dihydroxy-1,4-benzoquinone, resorcinol, ascorbic acid, ascorbic acid derivative, 1,4-dihydroxy benzene, 3-hydroxy tyramine (dopamine), rhodizonic acid, co-enzyme Q, 1,2,3-trihydroxy benzene (pyrogallol), 1,3,5-trihydroxy benzene (phloroglucinol), tetrahydroxy quinone (THQ), tetrahydroxy acetophenone, tetrahydroxy benzoic acid, hexahydroxy benzene, tetrahydroxy quinone, hexahydroxybenzene, chloranilic acid, chloranilic acid, chloranil, rhodizonic acid, fiuoroanilic acid, reduced fluoroanilic acid, fluoranil, duroquinone, 1-nitroso-2-napthol, martius yellow, hydroxy-1,4-naphthaquinone, naphthalene diol, tetrahydroxy napthalene, tetrahydroxy 1,4-naphthaquinone, echinochrome, pentahydroxy 1,4-naphthaquinone, anthranol, hydroxy anthraquinone, anthralin, anthrarufin, alizarin, di-hydroxyanthraquinone, anthrobin, anthragallol, purpurin, 1,8,9-anthracenetriol, 1,2,5,8-tetrahydroxyanthraquinone, carminic acid, purpogallin, hydroxybenzophenone, hydroquinone monobenzylether, hydroxy biphenyl, 2,2,4,4-tetrahydroxy benzophenone, phenolphthalein, indophenol, bromophenol blue, methylenedigallic acid, methylenedisalicyclic acid, S-hydroxy-2(5H)-furanone, hydroxycourmarin, fustin, hydroxindole, tetrahydropapaveroline, oxindole, o-phenanthroline, phenanthridine, 6(5H)phenanthridinone, hydroxyjulolidine, citrazinic acid, uracil, 2-amino-5-bromopyridine, 5-aminotetrazole monohydrate, 2-aminothiazole, 2-aminopyrimidine, 2-amino-3-hydroxypyridine, 2,4,6-triaminopyrimidine, 2,4-diamino-6-hydroxy pyrimidine, 5,6-diamino-1,3-dimethyluracil hydrate, 5,6-diamino-2-thiouracil, cyanuric acid, and/or hydroxy methyl pyridine. In some embodiments, the redox active flexible energy storage device is substantially free of organic redox-active additives.

In some embodiments, the flexible energy storage device is a battery. In general, the battery may be any suitable type of battery known to one of ordinary skill in the art. In some embodiments, the battery is a lithium ion battery. In such embodiments, the secondary ionic substance comprises lithium. In some embodiments, the lithium ion battery has at least one electrode comprising a lithium-containing material.

The present disclosure also relates to a method of forming the flexible energy storage device. The method comprises: soaking a polymer in a solution comprising the redox-active transition metal cations, the charge balancing anions, and water for 1 to 8 hours to form the redox-active polymer hydrogel electrolyte; disposing the redox-active polymer hydrogel electrolyte on a first electrode such that the redox-active polymer hydrogel electrolyte forms a uniform film covering an entirety of a top surface of the first electrode; and placing onto the redox-active polymer hydrogel electrolyte a second electrode such that the second electrode is separated from the first electrode by the redox-active polymer hydrogel electrolyte to form the flexible energy storage device. In some embodiments, one or both the electrodes are carbon electrodes as described above. In preferred embodiments, both the electrodes are carbon electrodes as described above. In some embodiments, the carbon electrodes are prepared by uniformly depositing on a conductive electrode support a metal support film and comprising activated carbon, conductive carbon, and a binder such that an entirety of a top surface of the conductive electrode support is individually covered by the film to form a carbon electrode. The conductive electrode support, activated carbon, conductive carbon, and binder may be as described above.

The present disclosure also relates to a redox-active polymer hydrogel electrolyte, comprising: 70 to 99.8 wt. % a polymer hydrogel; 0.1 to 15 wt. % redox-active transition metal ions which are at least one selected from the group consisting of vanadium, chromium, manganese, cobalt, and copper; and 0.1 to 15 wt. % charge-balancing anions which are at least one selected from the group consisting of hydroxide anions, halide anions, sulfate anions, nitrate anions, perchlorate anions, tetrafluoroborate anions, difluoro (oxalato)borate anions, hexafluorophosphate anions, and bis (trifluoromethanesulfonyl)imide anions. In some embodiments, the polymer hydrogel is a polyacrylic acid hydrogel comprising 2.5 to 50 wt. % polyacrylic acid, preferably 2 to 5.5 wt. %, preferably 5.5 to 10 wt. %, preferably 10 to 15 wt. %, preferably 20 to 25 wt. %, preferably 25 to 30 wt. %, preferably 30 to 35 wt. %, preferably 40 to 45 wt. %, preferably 45 to 50 wt. %, based on a total weight of redox-active polymer hydrogel electrolyte, based on a total weight of polymer hydrogel. In some embodiments, the redox-active transition metal ions are cobalt (II) ions, and the charge-balancing anions are sulfate anions. In some embodiments, the redox-active polymer hydrogel electrolyte is substantially free of iron.

EXAMPLES

Materials: Acrylic acid and 2,2-azodiisobutyramidin dihydrochloride (AIBN, >98%) were purchased from Sigma Aldrich. Polyvinylidene difluoride (PVDF), active (AC) and conductive additive (CC) carbon (Timical super C65) were obtained from MTI. Cobalt (II) sulfate heptahydrate, ethanol, I-methyl-2-pyrrolidone (NMP) and were purchased from Merck. Aluminum current collector was purchased from MRX Shenzhen Automation Equipment.

Polyacrylic acid (PAA) Preparation: Conventional radical polymerization method was used to produce polyacrylic acid (PAA) from the monomer, acrylic acid at a 60° C. in toluene by using the initiator AIBN as described in *Polymer,* 1999, 40, 6213-6224 which is incorporated by reference herein in its entirety. After completion of the reaction, PAA was precipitated from the solution and the solid was washed with excess diethyl ether to remove unreacted monomer. The dried polymer was dissolved in water (10% w/w) and doped with stoichiometric amounts of cobalt sulfate. The resulting mixture was stirred for 4 hours and homogeneous light pink colored polymer electrolytes were obtained. The amount of cobalt (Co) was ranging from 1% to 10% (w/w) in the polychelates and abbreviated as PAA-CoX where X was 3, 5, 7, and 10.

Fabrication of carbon composite electrodes: Carbon composite electrodes were synthesized by mixing of PVDF:AC:CC at weight fractions of 1:8:1, respectively, in N-methyl-2-pyrolidone (NMP) as described in *Int. J. of Energy Res.* 2020, 44, 4309-4320, which is incorporated by reference herein in its entirety. All the materials were mixed in NMP until getting homogeneous slurry. Aluminum current collector was used to cast the slurry by using a casting machine (MRX Shenzhen Automation Equipment). Then the samples were dried in an oven at 75° C. Subsequently, Hi-Throughput Precision Pneumatic Disk Cutter was employed to cut the electrodes with a carbon thickness of 15 μm and diameter 1.5 cm.

Instrumentation: Referring to the illustrations in FIG. 1A to 1C, the Perkin Elmer Fourier-transform infrared (FT-IR) spectrum of the PAA-CoX was obtained from the FT-IR spectrophotometer Spectrum Two™ in the range of 400-4000 $cm^{-1}$ with spectral resolution of 4 $cm^{-1}$. Energy dispersive X-ray (EDS) (TESCAN Lyra) spectroscopy was used to investigate preliminary mapping of elemental distribution of the fully dried polychelates. The polychelates were also characterized by transmission electron microscopy (TEM) to acquire more information on the morphology of the dried PAA-CoX. The TEM was carried out by dispersing a small amount of material in ethanol via sonication. The samples were then placed onto TEM grids which were dried for TEM investigation (FEI, Morgagni 268) at 80 kV. The structural properties of the dried polychelates were examined by X-ray diffraction spectroscopy (XRD) using Rigaku Ultima IV. Thermogravimetric analysis (TGA) was used to study the thermal stabilities by using Perkin Elmer Pyris-1. All the samples were heated from RT to 700 with a scan rate of 10° C. $min^{-1}$, under inert environment.

Fabrication of supercapacitors: Supercapacitor devices were assembled with a configuration with Al/Electrode/PAA-CoX/Electrode/Al. Additionally, the pristine PAA hydrogel was directly used as electrolyte without any additive in a device. Carbon composite electrodes were prepared as described above and were used to fabricate supercapacitors. The electrodes were placed in a split cell with different polychelates for the electrochemical performance tests. The supercapacitors were tested at different current densities in the range of 1 to 10 $Ag^{-1}$ by holding the cut off voltage was between −1.5 to 1.5 V. Cyclic volumetry (C-V) studies were performed by using a PalmSens4 potentiostat at different scan rates ranging from 10 to 100 $mVs^{-1}$.

Results and discussion: Referring to the illustrations in FIG. 1A to 1C, the PAA was prepared by free radical polymerization and polychelate hydrogels were produced by doping of the PAA with Co at various fractions to produce the PAA-CoX. The synthesized PAA-CoX swelled in water indicating partial complexation. Homopolymer PAA and PAA-CoX were studied by FT-IR and the results are illustrated in FIG. 1D. Pristine homopolymer displayed a strong peak at 1707 $cm^{-1}$ belonging to C=O stretching and a medium peak at 1250 $cm^{-1}$ to in plane deformation of C—O—H and another medium peak at 1165 $cm^{-1}$ due to stretching of —(C—O))H units. After doping of the PAA with Co, a new complex electrolyte was formed confirmed by variations of the peak intensities and positions. For example, intensity of the peak corresponding to C—O—H deformation increased at 1239 $cm^{-1}$ and the intensity of —C—O—H stretching at 1150 $cm^{-1}$ decreased. PAA-Co10 showed new strong peak at 1080 $cm^{-1}$ due to PAA-Co interaction. Additionally, an asymmetric weak absorption belonging to COO— at 1552 $cm^{-1}$ was observed due to complexation. All the peak shifting and changes in the intensities are summarized in Table 1, confirming metal chelate formation between $Co^{+2}$ and carboxylic acid units, a depiction of which is illustrated in FIG. 1C.

TABLE 1

FT-IR spectra ($cm^{-1}$) of PAA and PAA-CoX

| Assignment | PAA | PAA-COX |
|---|---|---|
| νC—H | 2929 w | 2935 w |
| νC=O | 1703 s | 1692 s |
| νC—OO⁻ asym. | — | 1552 w |
| νC—O—H defor. | 1239 s | 1239 w |
| ν(C—O)—H strech. | 1150 s | 1163 m |
| νCH | 914 w | — | s: strong;
w: weak;
m: medium

The results showed that the approximate fraction of coordinating acidic groups was 66% through the complex polymer matrix as described in *Polyhedron,* 1999, 18, 2511-2518 which is incorporated by reference herein in its entirety. At higher Co compositions such as the PAA-Co10, the peaks broadened and the corresponding peaks of the polymer overlapped, resulting in further complexation.

Figure 1E:
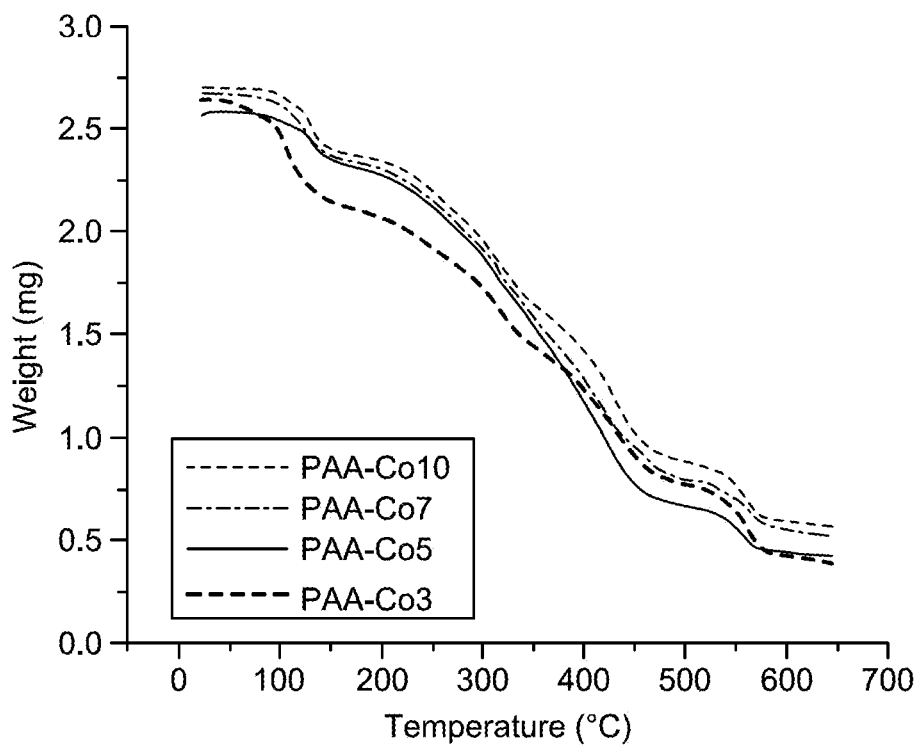
FIG. 1E shows thermal gravimetric analysis (TGA) plots of the PAA-COX (X=3, 5, 7 and 10 wt %)

FIG. 1E illustrates thermal stability of the polychelates studied by the TGA and the thermograms showed almost no weight change up to 100° C. After, there is a first weight loss stage, which extends up to 200° C. recognized by dehydration process. The loss within this doing was due to water that is coordinated to the metal ion present in chelates as described in *Polyhedron,* 1999, 18, 2511-2518 which is incorporated by reference herein in its entirety. Then the degradation of the polymer occurs in several steps up to 650° C.

Figure 1F:
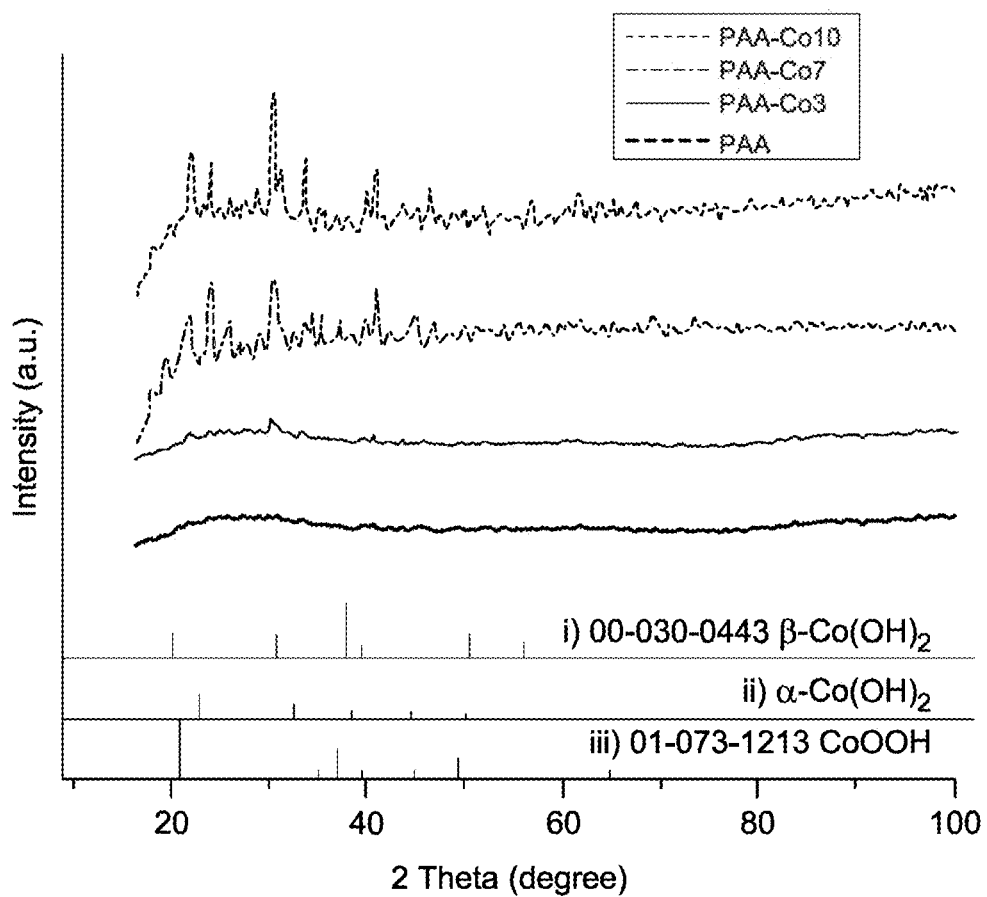
FIG. 1F shows X-ray powder diffraction (XRD) patterns of the PAA-COX (X=3, 5, 7 and 10 wt %)

FIG. 1F illustrates XRD study for the pristine PAA and PAA-Co3, PAA-Co7, and the PAA-Co10 samples were performed with angle ranging from 10° to 100°. The characteristic amorphous structures of both the homopolymer PAA and the PAA-Co3 were noticed in the spectrum. However, at higher Co-doped samples (PAA-Co7 and PAA-Co10) there is a high degree of complexation leading to formation of weak crystal domains which are embedded in the polymer matrix. A comparative analysis was performed with the standard JCPDS cards (FIG. 1F inset; (1) 00-030-0443, (ii) *J. Phys. Chem. C.* 2010, 114, 111-119 which is incorporated by reference herein in its entirety and (iii) 01-073-1213) verified the structure of the samples are composed of abundant β-Co(OH); phase and other phases as well such as α-Co(OH); and CoOOH as described in *Elec-*

*trochim. Acta*, 2013, 98, 32-38 which is also incorporated by reference herein in its entirety.

Figure 2B:
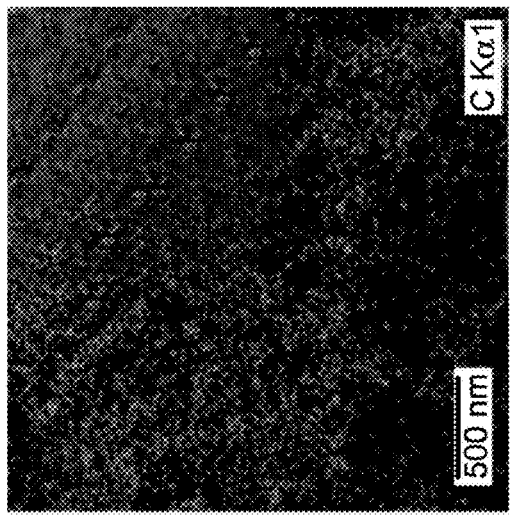
FIG. 2B shows an elemental mapping of carbon present in the PAA-Co7 polychelate.
Figure 2D:
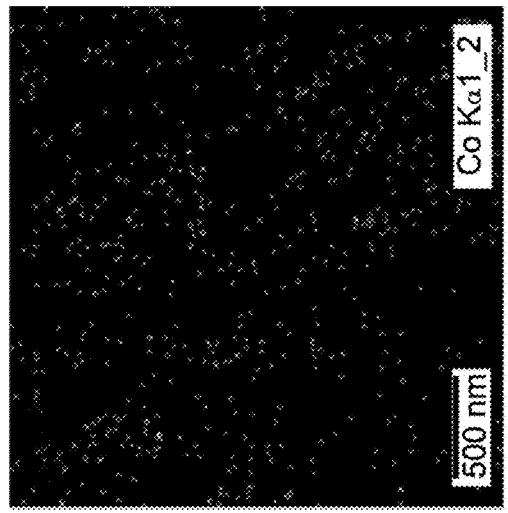
FIG. 2D shows an elemental mapping of cobalt present in the PAA-Co7 polychelate.
Figure 2A:
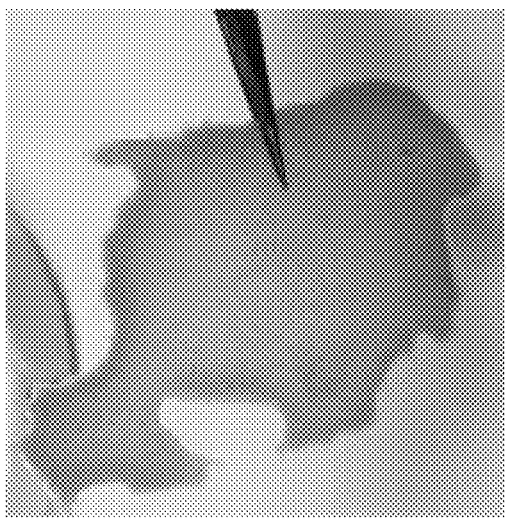
FIG. 2A shows a macroscopic image of the PAA-Co7 polychelate.
Figure 2C:
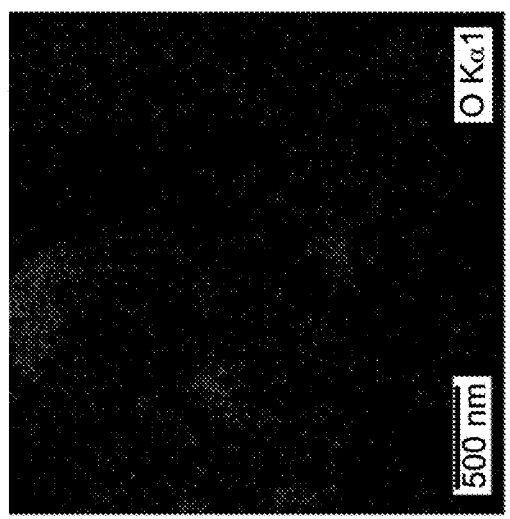
FIG. 2C shows an elemental mapping of oxygen present in the PAA-Co7 polychelate.

Referring to FIG. 2A to FIG. 2D, homogeneous distribution of elements in the dried electrolyte (see FIG. 2A) was extracted from the elemental mapping of the polychelates using EDS. FIG. 2B to FIG. 2D show the images of carbon, oxygen, and cobalt contents where C, O and Co maps are matched with each other in terms of concentrations showing that the distribution of cobalt along the polymer chains is uniform. From these results we can conclude that the formation of polychelates form complex cobalt domains that are homogeneously dispersed in the PAA matrix.

Figure 2F:
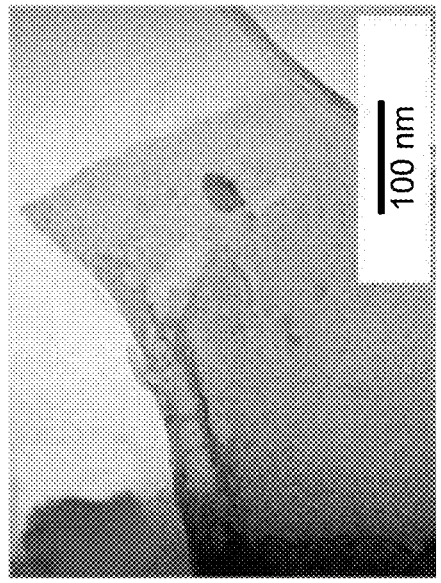
FIG. 2F shows a TEM image of pure PAA.
Figure 2H:
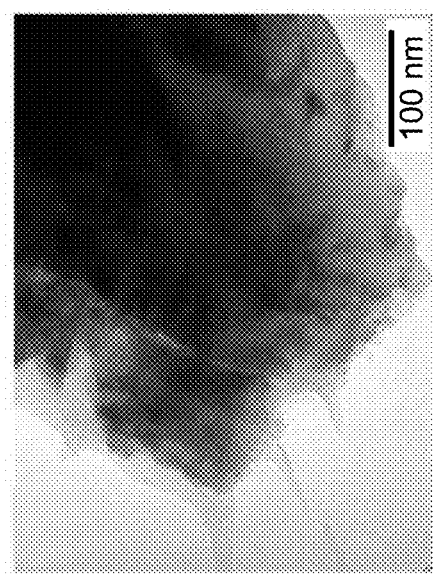
FIG. 2H shows a TEM image of PAA-Co10.
Figure 2E:
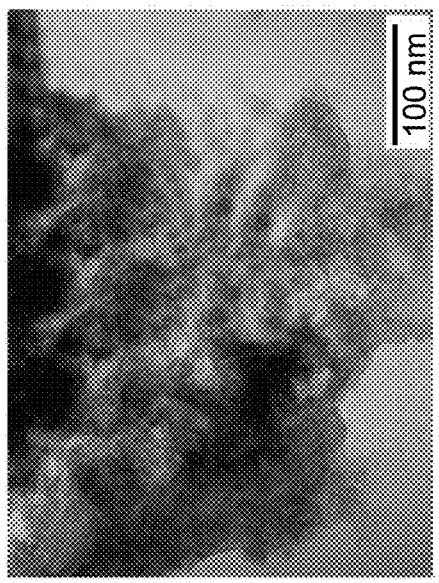
FIG. 2E shows a transmission electron microscopy (TEM) image of PAA-Co5.
Figure 2G:
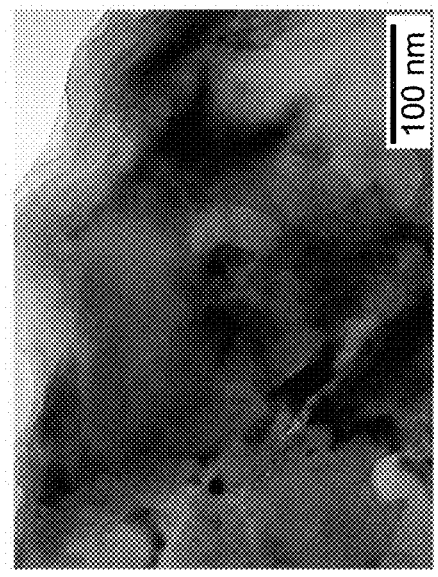
FIG. 2G shows a TEM image of PAA-Co7.

Referring to FIG. 2E to FIG. 2H illustrating TEM images of the PAA-Co3, PAA-Co5, PAA-Co7 and PAA-Co10, a comparison of the morphologies of the polychelates was performed at all contents, including the pure PAA shown in FIG. 2F. No change is observed in the morphology of the PAA-Co5 which could be described by the homogeneous character of dried material with virtually no porosity and aggregation. In the meantime, the PAA-Co7 showed some black parts which become denser compared to the PAA-Co5. Some holes and porosity in the structure were noticed for the PAA-Co7 indicating the complexation of acrylic acid with the Co by forming chelating interactions as illustrated in FIG. 2G. At higher Co contents, i.e., the PAA-Co10, the material exhibited no porosity in the polymeric structure illustrated FIG. 2H. These findings are in agreement with final physical properties of the polychelate where the PAA-Co10 showed a lower performance in supercapacitor applications.

Figure 3A:
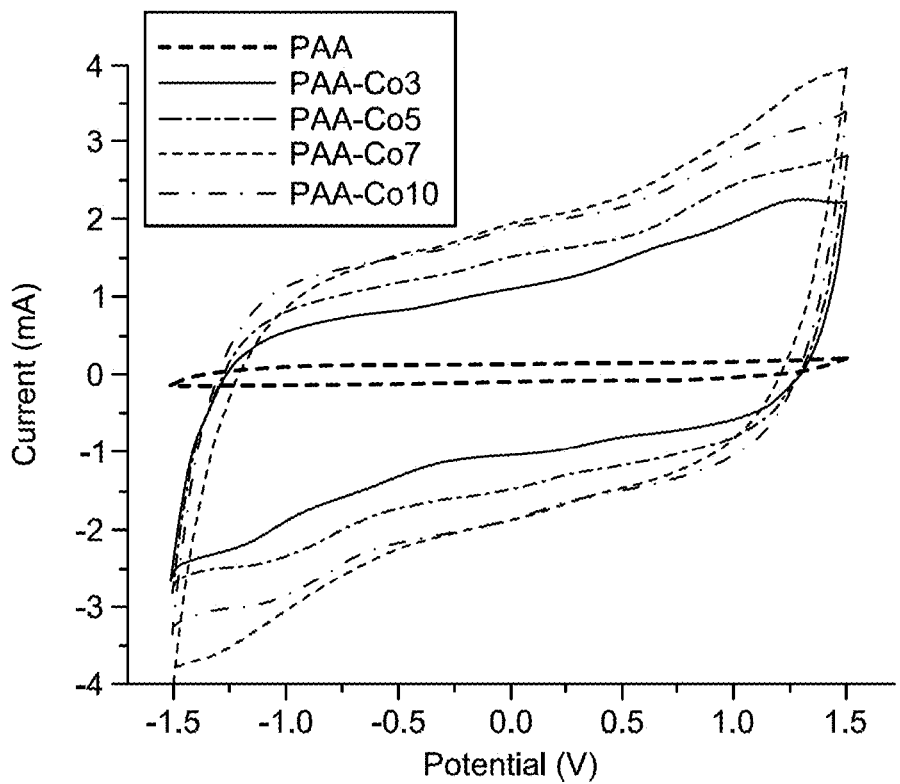
FIG. 3A illustrates cyclic volumetry (C-V) measurements of the PAA and PAA-CoX (X=3, 5, 7 and 10 wt %) containing supercapacitors in the potential window of −1.5 to 1.5 V at a scan rate of 10 mV s$^{-1}$.

Referring to FIG. 3A illustrating cycle volumetry (C-V) measurement of the PAA containing supercapacitor in the potential window of −1.5 to 1.5 V at a scan rate of 10 mV s$^{-1}$. The CV voltammograms shows quasi-rectangular electric double-layer capacitance (EDLC) and pseudocapacitive profiles of the PAA-COX (X: 3, 5, 7 and 10) along with redox couples during the forward and reverse scan. The increase in current is observed by adding the Co ions up to the PAA-Co7, which indicates that the electrolyte containing the Co increases the charge storage capacity of the device. This is explained by the formation of redox couples of Co II/I observed at Epa: −0.1 V and further Epc: peaks are observed with a slight shifting from −0.8 V to −1.2 V as the Co concentration is increased. The peaks observed around Epa: 1.2 V and Epc: 0.3 V is attributed to the Co III/II redox couple as described in *Int. J. Electrochem. Sci.* 2012, 7 3167-3177 and *J. Electrochem.*, 2009, 45, 1170 both incorporated by reference herein in its entirety. The results showed that a further increase in the Co (PAA-Co10) concentration did not increase the capacitance of the device. This is attributed to the formation of the polychelates (PAA-Co), which tend to reach a plateau by reaching the maximum complexation rate of the electrolyte at the PAA-Co7.

FIG. 1C illustrates a model for complex formation of the PAA interchelated with the cobalt ions. The cobalt ions have become positively charged in the PAA-CoX electrolyte. Electrochemical reaction under certain voltages on the anode side, lead formation of redox pairs of the Co II/I and Co III/II facilitating ion exchange through the active carbon layers and improves the charge storage capacity by contributing the double layer formation. At the same time the negatively charged $SO_4$ ions and deprotonated carboxylate units on the PAA accumulated at the cathode side.

Figure 3B:
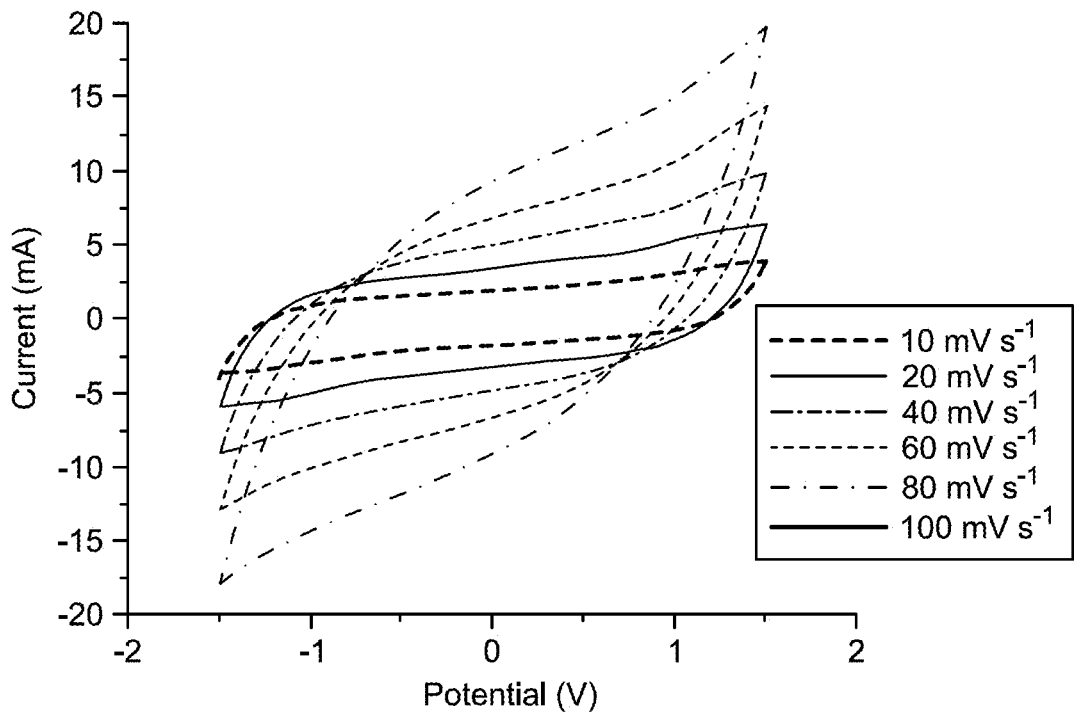
FIG. 3B illustrates the scan rate dependent CV profiles of the PAA-Co7 based supercapacitor at various scan rates between 10 mVs$^{-1}$ to 100 mVs$^{-1}$.

FIG. 3B illustrates the scan rate dependent CV profiles of the PAA-Co7 based supercapacitor between 10 mV s$^{-1}$ to 100 mV s$^{-1}$ indicates the superior ion diffusion property within the scanning range. The property of fast ion transfer was observed for the PAA-Co7 as the scanning rate increases. In addition, it also shows the supercapacitor enables a faster ion diffusion between the electrodes. The same characteristic was maintained at higher scan rates, suggesting outstanding electrochemical stability and cyclic reversibility.

Referring to FIG. 3C illustrating the EIS (Nyquist) plots of the PAA and the PAA-Cox (X:3,5,7 and 10) polychelates containing devices obtained in a frequency range of 10 mHz to 100 kHz. Vertical rising shapes of EIS curves parallel to the Z-axis in the low frequency domain reveal the capacitive behavior of all supercapacitor cells. The semi-circular curves in the high frequency region are shown in FIG. 3C and their enlarged representation are shown in FIG. 3D. The diameter of the semi circles indicates the charge transfer resistance (Ret) of the devices as described in *J. Power Sources.*, 2018, 402, 133-146 incorporated by reference herein in its entirety and the data obtained by fitting the equivalent circuit shown in FIG. 3F. Each cell electrode associated with resistance/conductivity behavior has a suppressed curve region in the high frequency domain of the EIS plot. The resistance of the devices containing the electrolyte resistances (equivalent series resistance (ESR)) as described *ChemElectroChem*, 2019, 6, 2876-2882 incorporated by reference herein in its entirety is obtained from the intersections of the Z' axis in the high frequency region shown in Table 2. Resulting data shows the lower cell resistivity observed at the PAA-Co7 containing device followed by the PAA-Co10. This indicates the resistance/conductivity ratio reaches a plateau at polymer containing Co7, and further increase in the Co amount (Co10) have no effect. Warburg impedance (W) obtained from the mid-frequency region shows finite ion diffusion and ion transport limits within the porous carbon structure of the electrolyte as described in *J. Power Sources.*, 2018, 402, 133-146 which is incorporated by reference herein in its entirety.

The ionic conductivities of the polychelates were calculated using the Eq. (1) at room temperature.

$$\sigma(S/cm) = L(cm)/R(\Omega) \times A(cm2), \quad (1)$$

where σ is the conductivity, L is electrode thickness, A is the surface area and R is resistivity. The resistivity of the electrodes was obtained from the electrochemical impedance (EIS) measurements.

TABLE 2

ESR, $R_{ct}$ and ionic conductivity of the PAA-CoX supercapacitors.

| Device | ESR (Ω) | $R_{ct}$ (Ω) | Ionic Conductivity S cm$^{-1}$ |
|---|---|---|---|
| PAA-Co3 | 9.45 | 105.74 | 1.30 × 10$^{-4}$ |
| PAA-Co5 | 6.10 | 75.10 | 2.15 × 10$^{-4}$ |
| PAA-Co7 | 1.33 | 55.41 | 2.55 × 10$^{-4}$ |
| PAA-Co10 | 2.21 | 51.12 | 3.15 × 10$^{-4}$ |

Figure 3E:
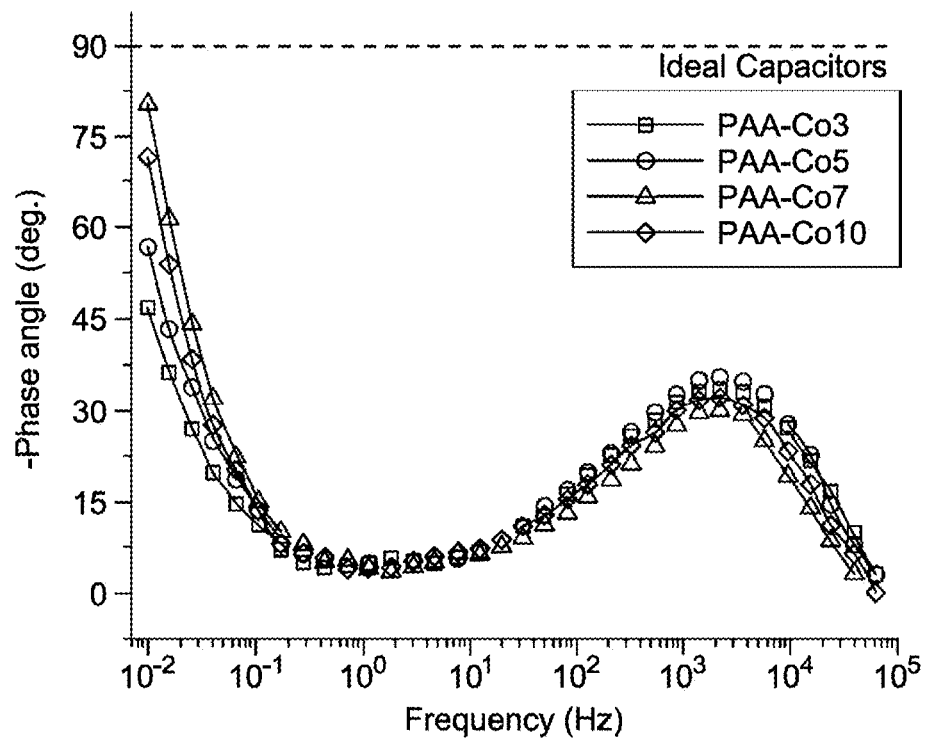
FIG. 3E illustrates the frequency (Hz) dependent phase angle (degree) behavior of PAA-COX (X=3, 5, 7 and 10 wt %) based supercapacitors.

FIG. 3E illustrates the frequency (Hz) dependent phase angle (degree) behavior of all supercapacitors. The dashed line shows the phase angle 90°, which represent the ideal capacitor behavior for the entire frequency range as described in *J. Power Sources*, 2020, 451, 227771 which is incorporated by reference herein in its entirety. The PAA-COX (X: 3,5,7 and 10) based supercapacitors showed the phase angle 47.4°, 57.3°, 72.6° and 81.2°, respectively in the low-frequency domain. This indicates the cells have higher capacitive performance in the lower frequency region.

Figure 3F:
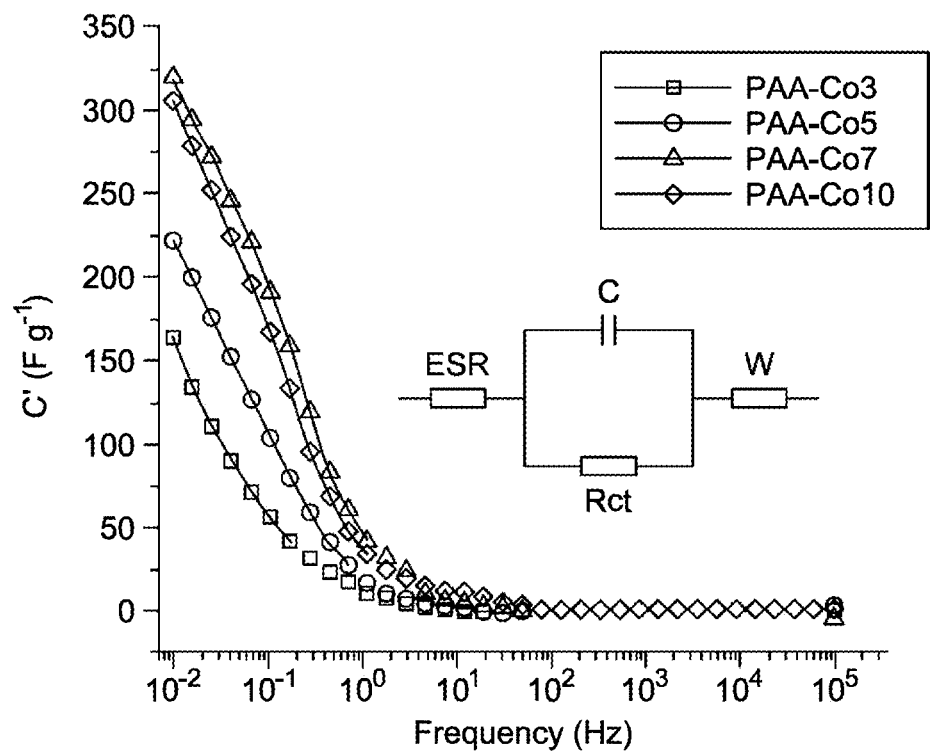
FIG. 3F shows complex real capacitance (C') vs. frequency (Hz) of PAA-CoX (X=3, 5, 7 and 10 wt %) based supercapacitors.
Figure 3G:
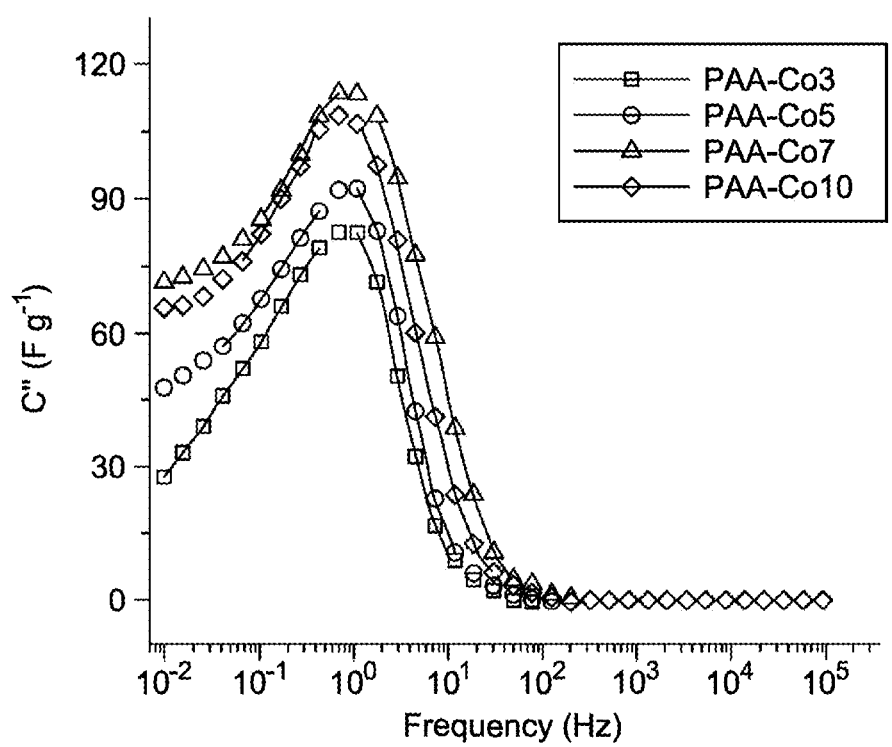
FIG. 3G shows complex imaginary capacitance (C") vs. frequency (Hz) of PAA-CoX (X=3, 5, 7 and 10 wt %) based supercapacitors.

To obtain complex capacitance and ion diffusion kinetics, real and imaginary (C' and C") complex capacitance curves were plotted for all super capacitors depending on the frequency illustrated in FIG. 3F and FIG. 3G. Complex capacitance data (C' and C") are defined using Eqs. (9) and (10).

$$C' = \frac{-Z''(\omega)}{\omega |Z(\omega)|^2} \quad (2)$$

$$C'' = \frac{Z'(\omega)}{\omega |Z(\omega)|^2} \quad (3)$$

The frequency-dependent slope of the C' curve in the high-frequency domain was calculated as almost zero up to 0.1 Hz. A trend towards a saturation of a C" value was observed in the low frequency domain, indicating the rate of ion diffusion. The real part of the complex capacitance (C") corresponds to the device capacitance measured at DC, and this value is towards the constant current capacitance value at the lowest frequency point as described in Solid State Ion. 2016, 288, 311-314 which is incorporated by reference herein in its entirety.

Figure 4A:
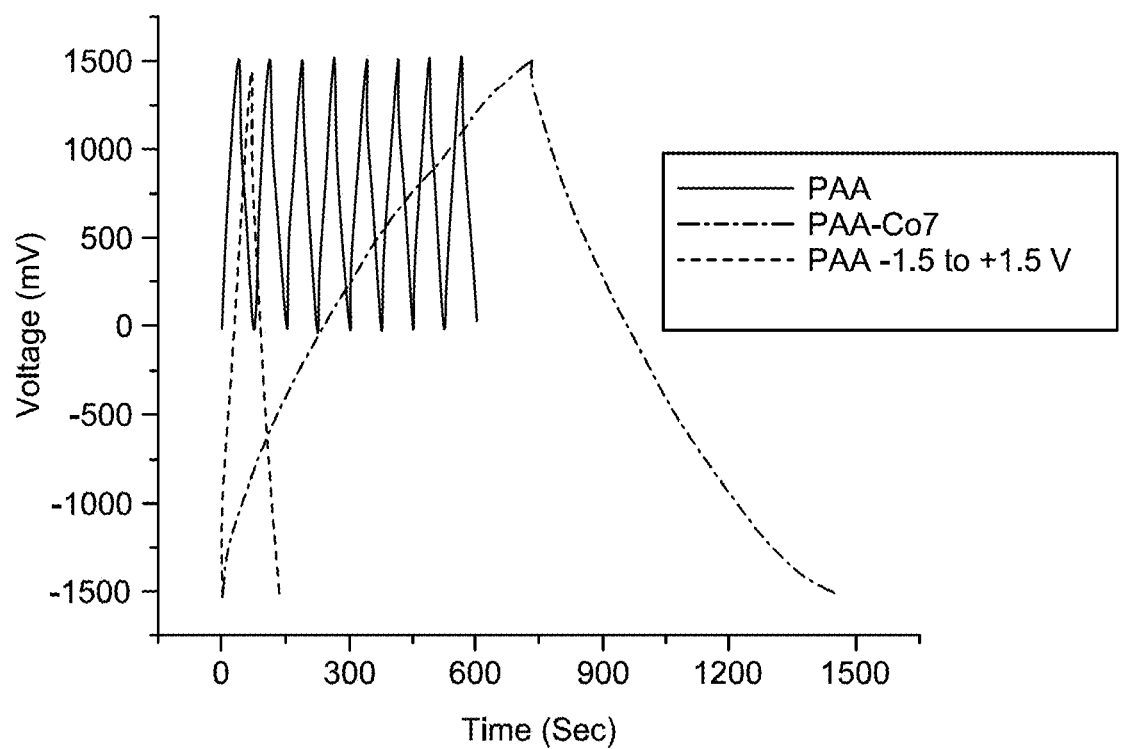
FIG. 4A shows comparison of the galvanostatic charge-discharge (GCD) profiles of the supercapacitor with neat PAA and PAA-Co7 at 1 mA.
Figure 4B:
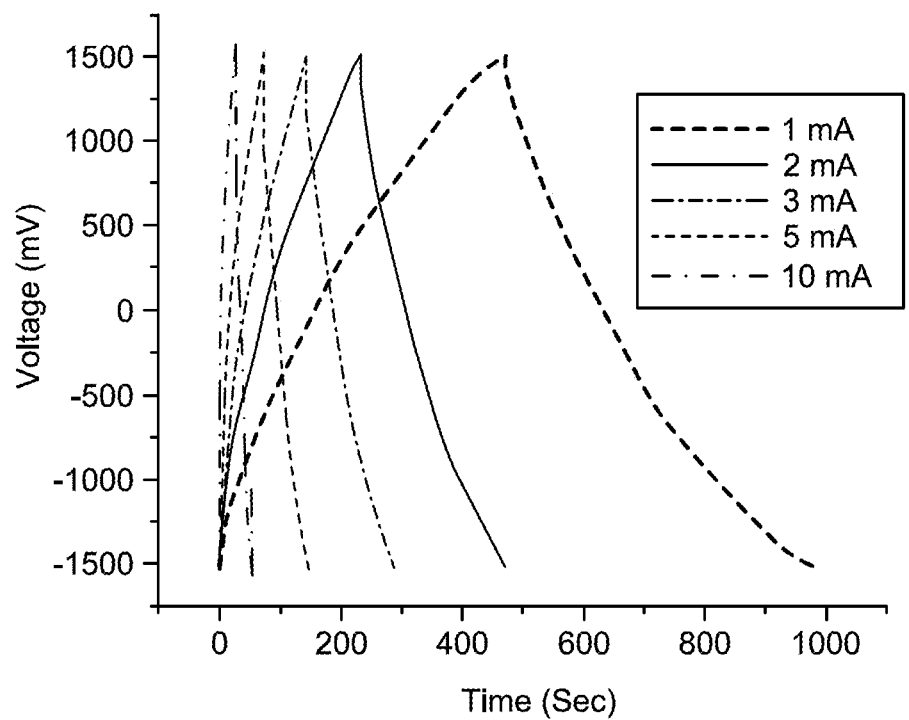
FIG. 4B shows GCD performance of supercapacitors with PAA and PAA-Co7 at 1 mA.
Figure 4C:
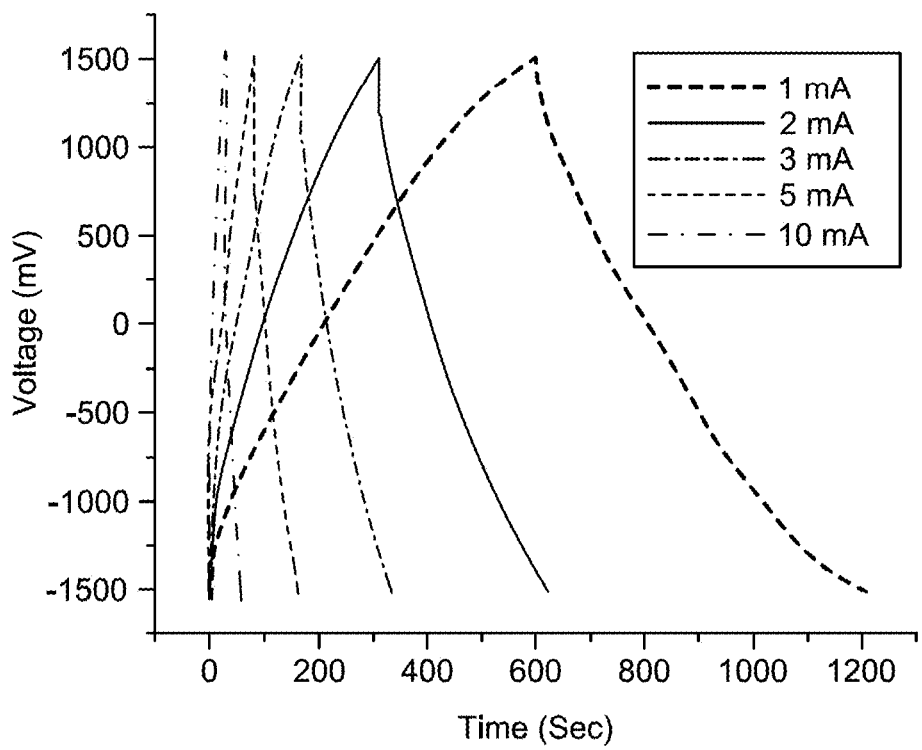
FIG. 4C shows a graph of GCD plots of PAA-Co5 based device at 1-10 mA.
Figure 4D:
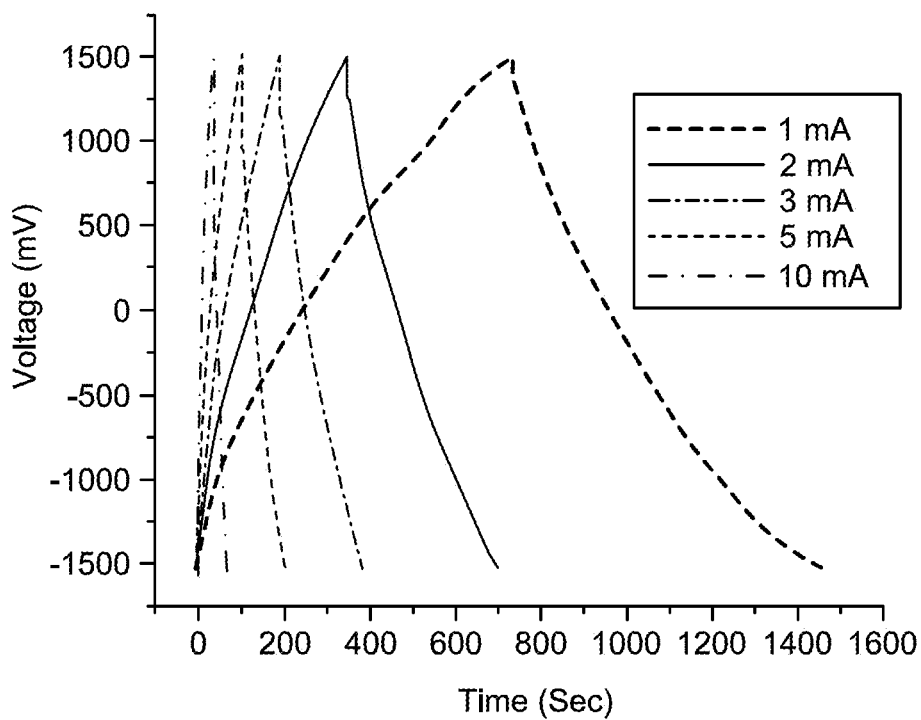
FIG. 4D shows a graph of GCD plots for PAA-Co7 based device at 1-10 mA.
Figure 4E:
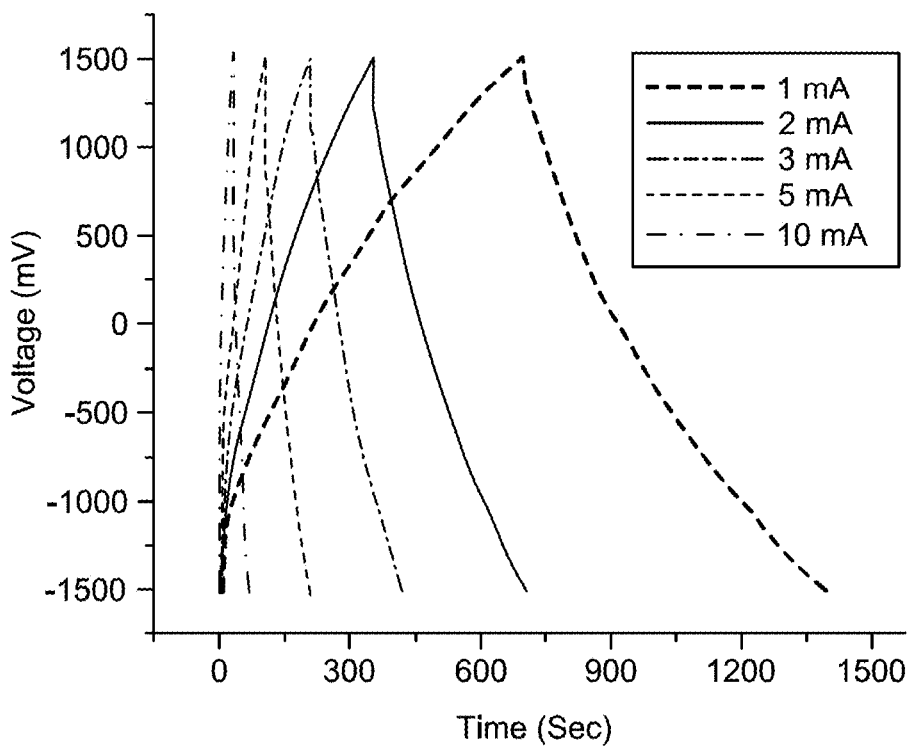
FIG. 4E shows a graph of GCD plots for PAA-Co10 based device at 1-10 mA.

Imaginary complex capacitance (C") shows irreversible relaxation processes that cause losses in supercapacitors. The peak seen in the low frequency (fo) of the C" shows point where transition between from resistive to capacitive behavior of the device as described in Solid State Ion. 2016, 288, 311-314 which is incorporated by reference herein in its entirety. Different factors such as redox mediator and the state from gel to solid structure of the electrolyte affect this situation. It has been observed that the peaks from the devices with low cobalt (Co3) to the devices with high cobalt (Co10) shifted slightly to the high frequency region, which is due to the increase in capacitance provided by the Co. FIG. 4A illustrates the GCD curves of the supercapacitors, including the pristine PAA and the PAA-Co7. The comparison of the symmetric supercapacitors was performed with the different voltage ranges while-1.5 V to 1.5 V applied to the redox system and 0) V to 1.5 V applied for the pure PAA. A further GCD measurement was applied for the PAA containing device between −1.5 V to 1.5 V to make better comparisons with the PAA-CoX at a current density of 1 mA. The reason of starting from negative voltage domain is to include the whole electro-active contribution of Co-incorporated polychelates in the supercapacitor. The curves clearly demonstrate that there is almost 15 times improvement in the discharge time of the redox active unit containing electrolytes as compared to the pure PAA. The enhancement in the capacitance of the device can be described by redox reactions of the Co on the carbon electrodes.

Figure 4F:
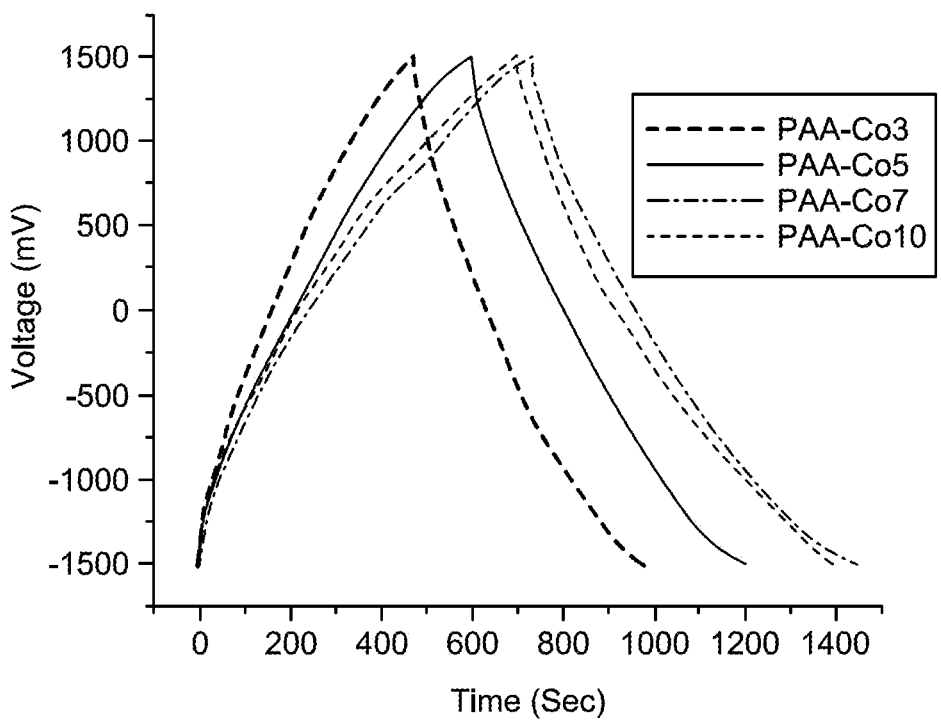
FIG. 4F shows a comparison of GCD profiles of the PAA-COX (X=3, 5, 7 and 10 wt %) based supercapacitors at 1 mA.

FIG. 4B to 4E illustrate the GCD performance of the supercapacitors with PAA-CoX (X: 3, 5, 7, 10) between −1.5 V to 1.5 V and at various current densities. The pseudocapacitive contribution of the Co ions observed on the GCD profiles of supercapacitors and the discharge time which is related to capacitance, increased with increasing the percentage of the Co in the electrolyte. For all systems, due to faster charge storage behavior of the devices, the discharge time decreased with increasing the current density. Comparative GCD curves of the devices with the various polychelate compositions are plotted at a current density of 1 mA, demonstrated that the highest discharge time and maximum capacitance was provided by the PAA-Co7 illustrated in FIG. 4F. Voltage drop properties of the supercapacitors are obtained using the Eq. 4 and the data is matched well with the GCD profiles for all supercapacitor devices $$R_{ESR} = V_{drop}/2I \quad (4)$$

RESR is the equivalent internal resistance of the device, I is the applied current during the discharge process.

Figure 5A:
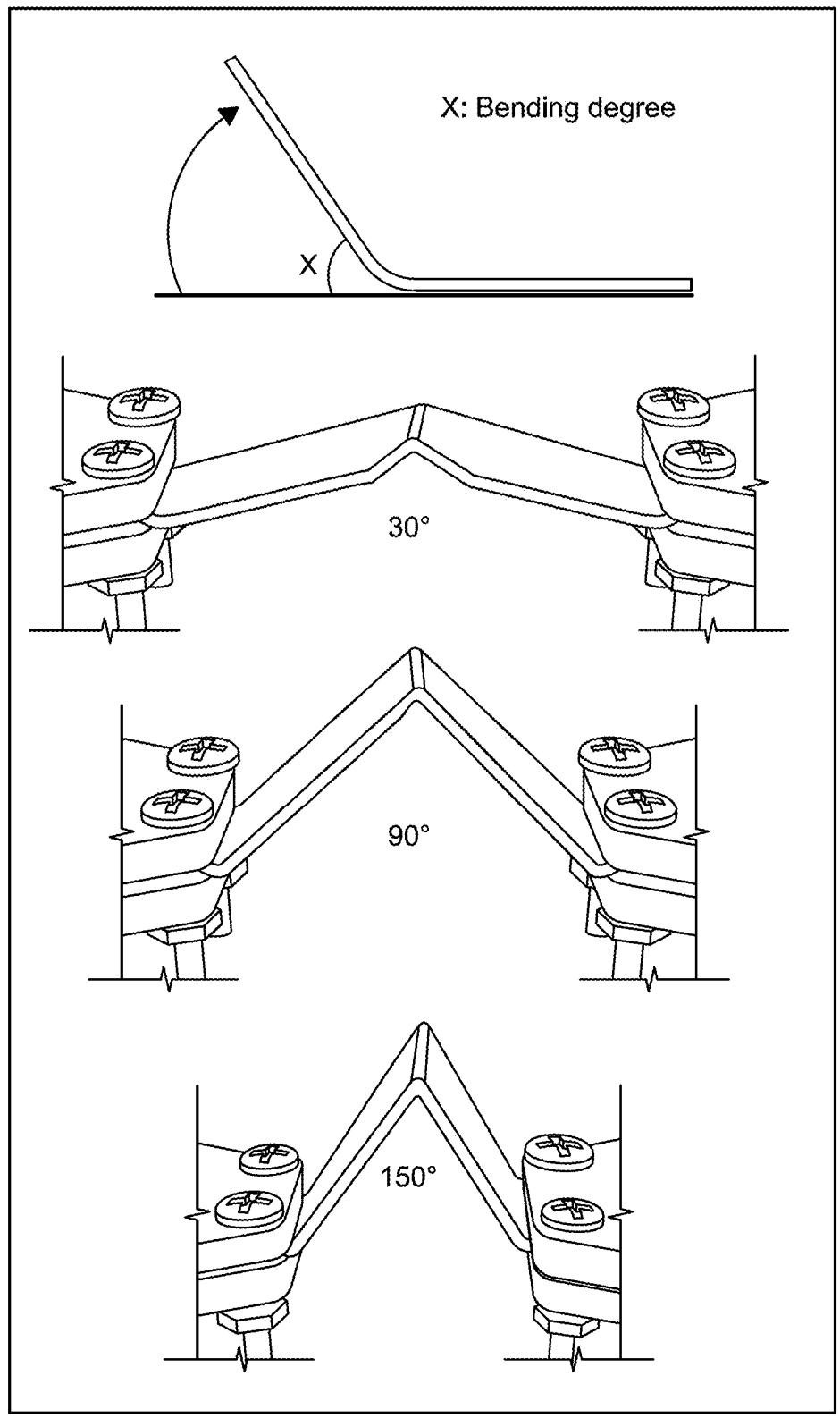
FIG. 5A are illustrations of the bending of the energy storage devices of supercapacitor and supercapacitors at bending angles of 300, 90°, and 150°.
Figure 5B:
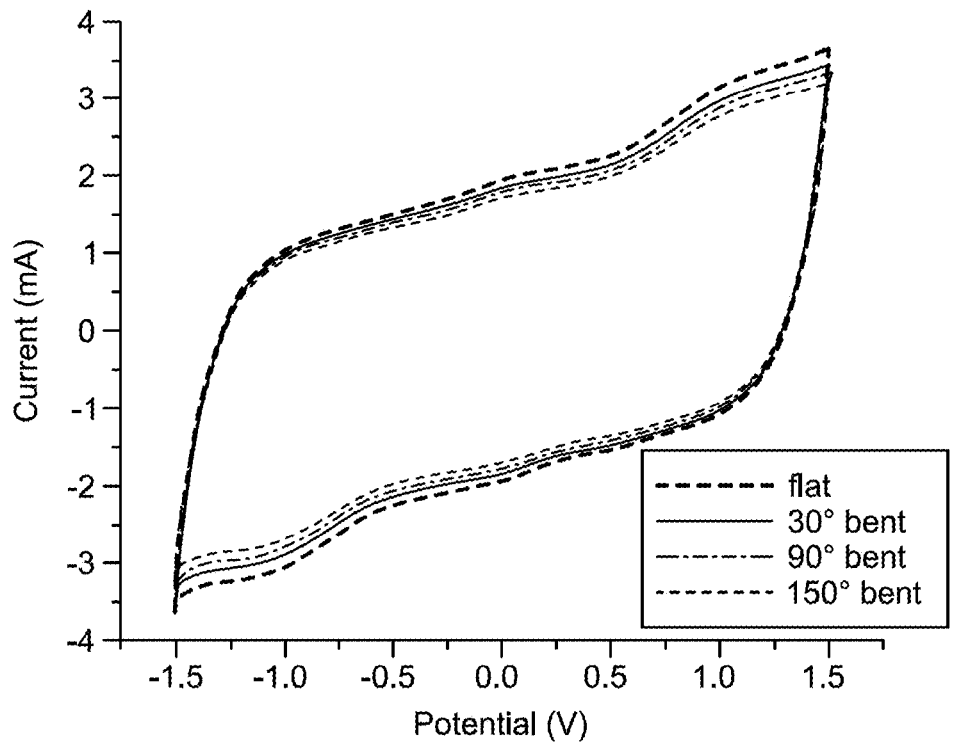
FIG. 5B shows CV of a bent device with PAA-Co7 at different bending angles.
Figure 5C:
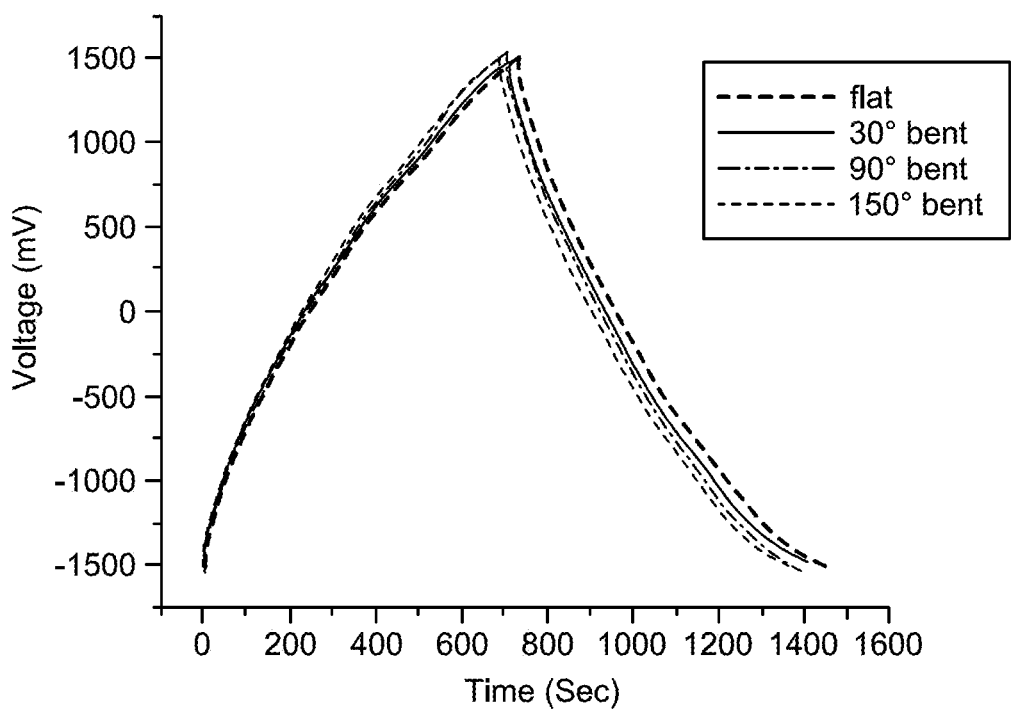
FIG. 5C shows GCD profiles under different bending angles.
Figure 5D:
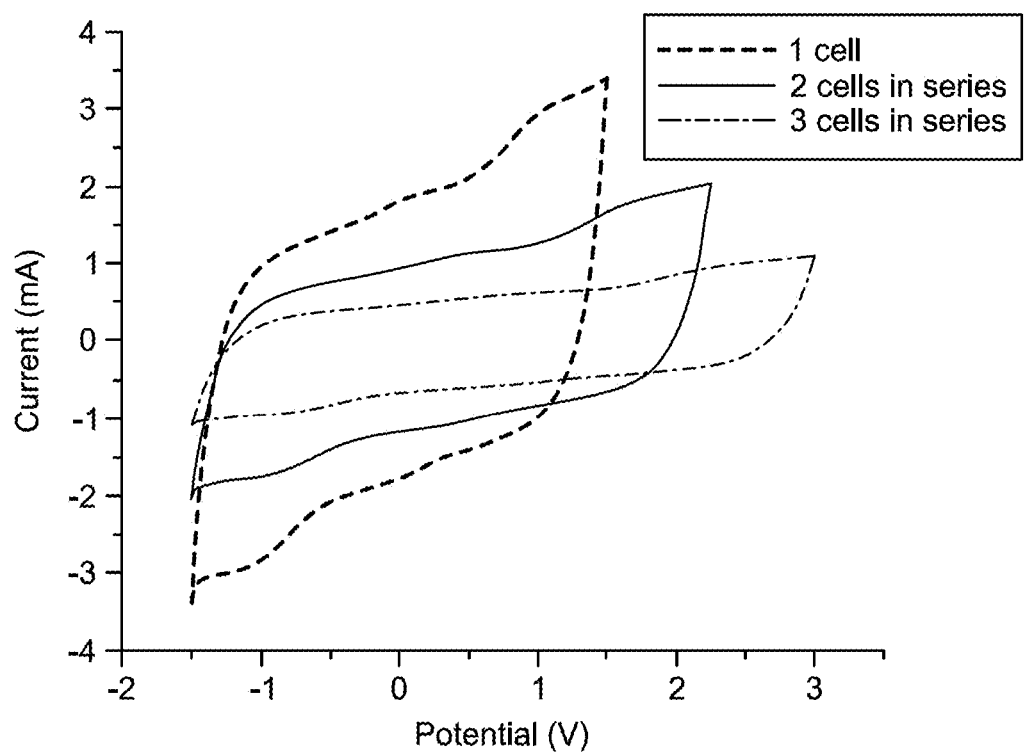
FIG. 5D shows graphical representation of CV voltammograms of cells (1-3 cells) connected in series at a rate of 10 mVs$^{-1}$.
Figure 5E:
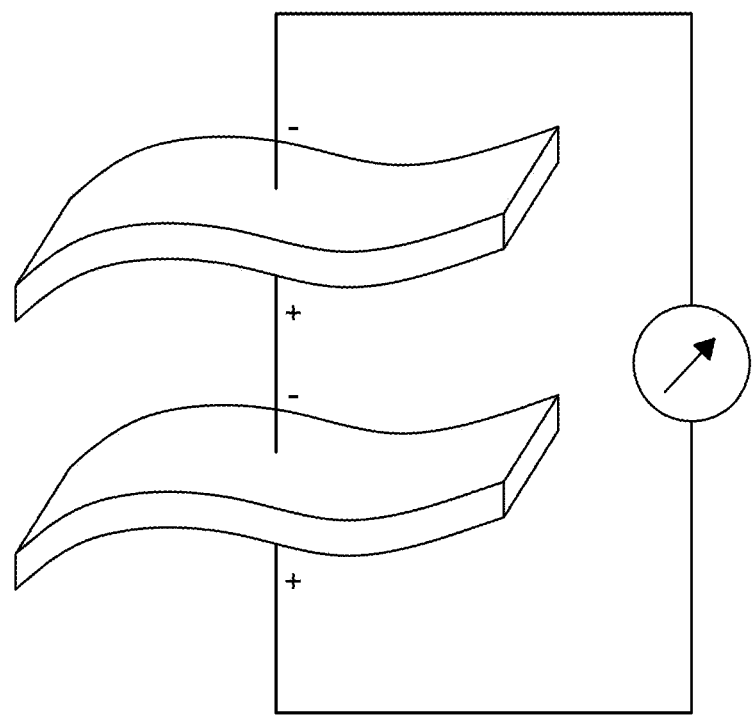
FIG. 5E shows CV voltammograms of cells (1-3 cells) connected in series at a rate of 10 mVs$^{-1}$.
Figure 5F:
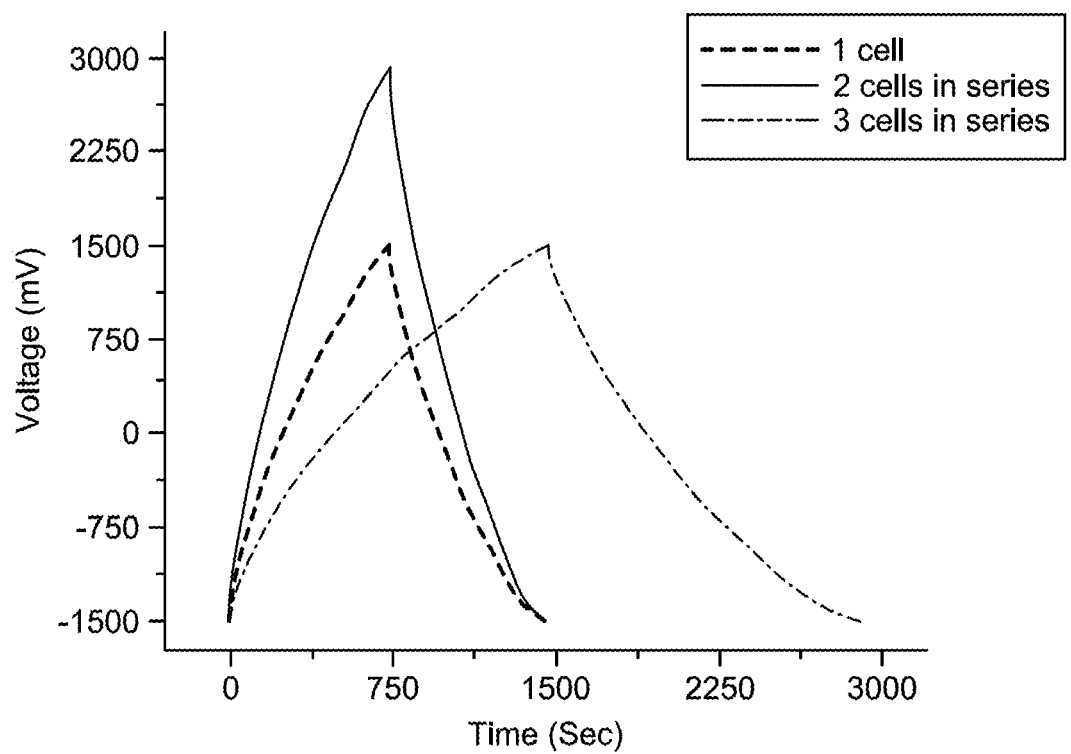
FIG. 5F shows graphical representation of comparison of GCD diagrams of cells with series connections.
Figure 5G:
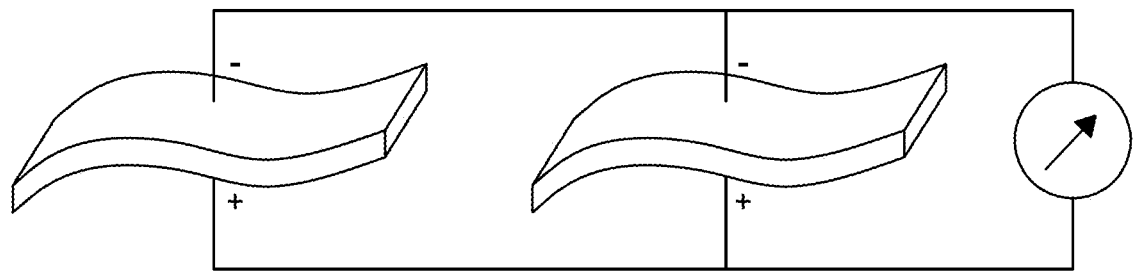
FIG. 5G also shows comparison of GCD diagrams of cells with parallel connections.

For practical use of the assembled supercapacitor, the flexibility of the electrode and electrolyte are key parameters where the devices can be bent at different angles as shown in FIG. 5A. The stability test via the CV studies was performed in different bending states (flat, 30°, 90°, and 150°) by using the supercapacitor device with the PAA-Co7 as illustrated in FIG. 5B. The voltammograms show an excellent stability that was obtained from the device at all bending angles starting from the flat state to the 150° bend. Further mechanical stability testing as carried out by the GCD experiments at various angles and the results supported by the CV studies illustrated in FIG. 5C. Additional CV measurements were done with assembled devices with two and three different series connection cells to reach to a higher voltage illustrated in FIG. 5D and FIG. 5E. The two cells in series reached to 2 V and the system with three cells produced 3V. Similarly, the GCD tests were also applied for the same systems and the devices showed increasing potentials from 2 V to 3 V at 1 mA upon the connection in series. However, a longer discharge time, that is related to capacitance was confirmed by parallel connection of the assembled cells illustrated in FIG. 5F and FIG. 5G.

Figure 5H:
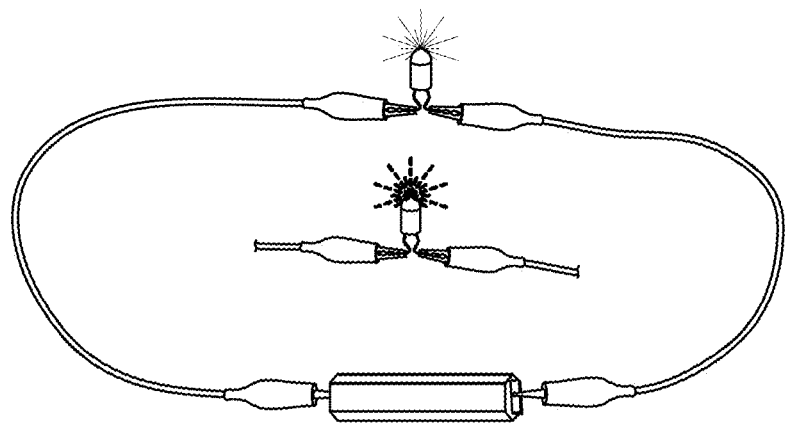
FIG. 5H shows photograph of RBG LED which is connected to a charged supercapacitor.

Practical application of the supercapacitor comprising the PAA-Co7 was performed in connection of the assembled device with LED light. The device (1.5 cm×3 cm) has the capability to light RBG (red-blue-green) color LED as shown in FIG. 5H.

Figure 6A:
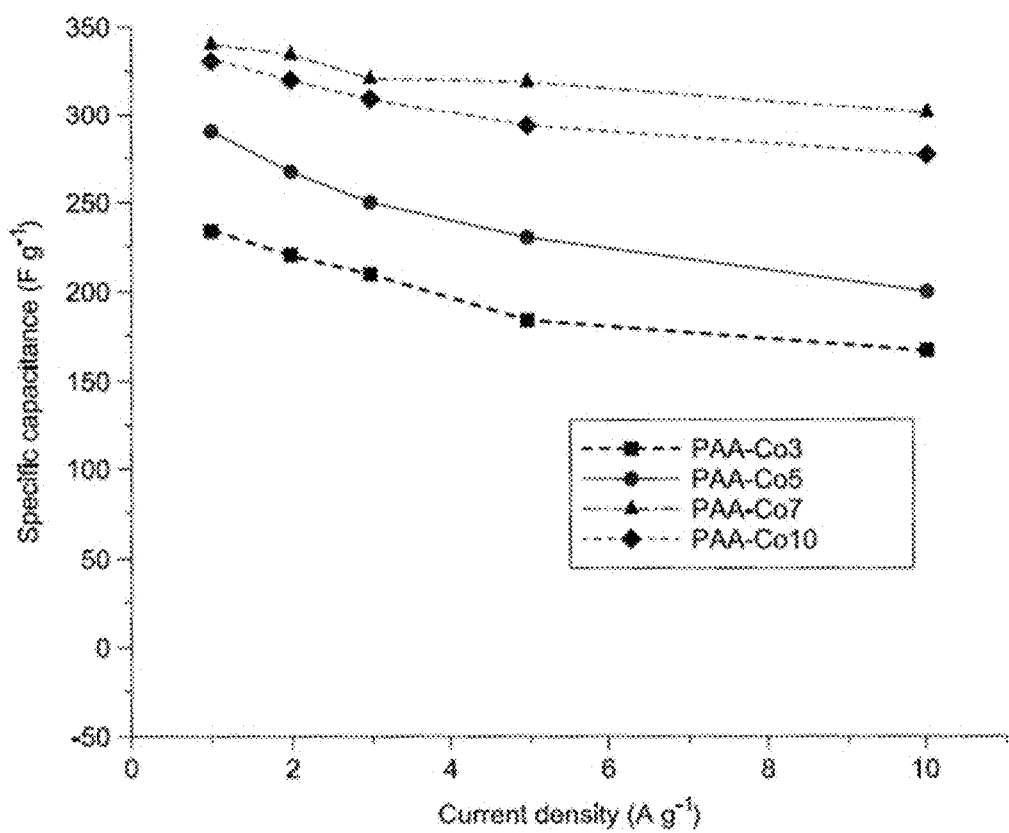
FIG. 6A shows the specific capacitances (Cs) of PAA-CoX (X=3, 5, 7 and 10 wt %) based supercapacitors investigated at different current densities (1, 2, 3, 5 and 10 mA)

FIG. 6A illustrates the specific capacitances ($C_s$) of the PAA-CoX based supercapacitors investigated at different current densities (1, 2, 3, 5 and 10 mA) in order to represent the rate capability. The $C_s$ from the GCD curve for the devices shows non-linear profiles have been evaluated using the Eq. (5) as described in J. Power Sources., 2018, 402, 133-146 and as described in Electrochem. Commun., 2015, 60, 21-25 which is incorporated by reference herein in its entirety.

$$C_s, \text{cell} = I \int V dt/w \times \Delta V \quad (5)$$

Figure 6B:
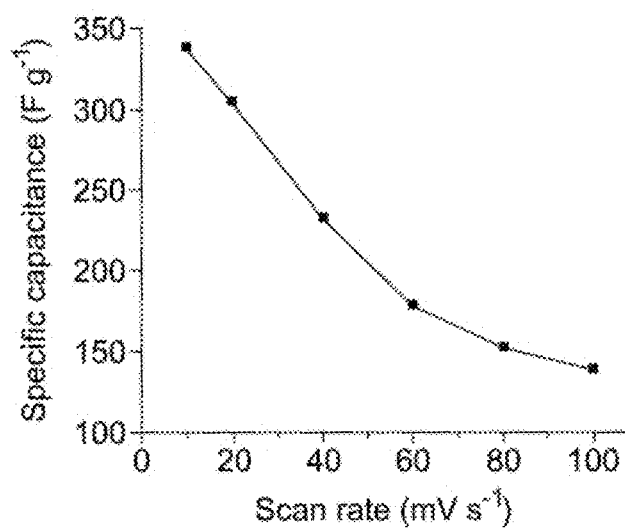
FIG. 6B shows the dependence of the specific capacitance on the scan rate.

∫Vdt is the area under the discharge curve (GCD curve); ΔV is the operating voltage range, initial voltage−final voltage; w and I correspond to the total weight of both the electrodes and redox active species, and discharge current, respectively. The total mass of active material in an electrode is weighed around 1 mg. The $C_s$ value was further confirmed by evaluating the CV curves using the Eq. (6) as described in J. Power Sources., 2020, 451, 227771 and as described in Electrochem. Commun., 2015, 60, 21-25 which is incorporated by reference herein in its entirety illustrated in FIG. 6B.

$$C_s, \text{cell} = \int I dv/v \times w \times \Delta V \quad (6)$$

∫Idv is the area between the forward and reverse scan of the CV curve; v is the scan rate. $C_s$ of whole cell ($C_s$,cell) without redox-active unit was calculated using Eq. (7) as described in *Electrochem. Commun.*, 2015, 60, 21-25 which is incorporated by reference herein in its entirety within the current density from 1 to 10 $Ag^{-1}$:

$$C_s, \text{cell} = I\Delta t/w\Delta V \quad (7)$$

here $\Delta t$ and w correspond to the discharge time, voltage difference in discharge, total weight of both the electrodes and electrolyte respectively.

Figure 6C:
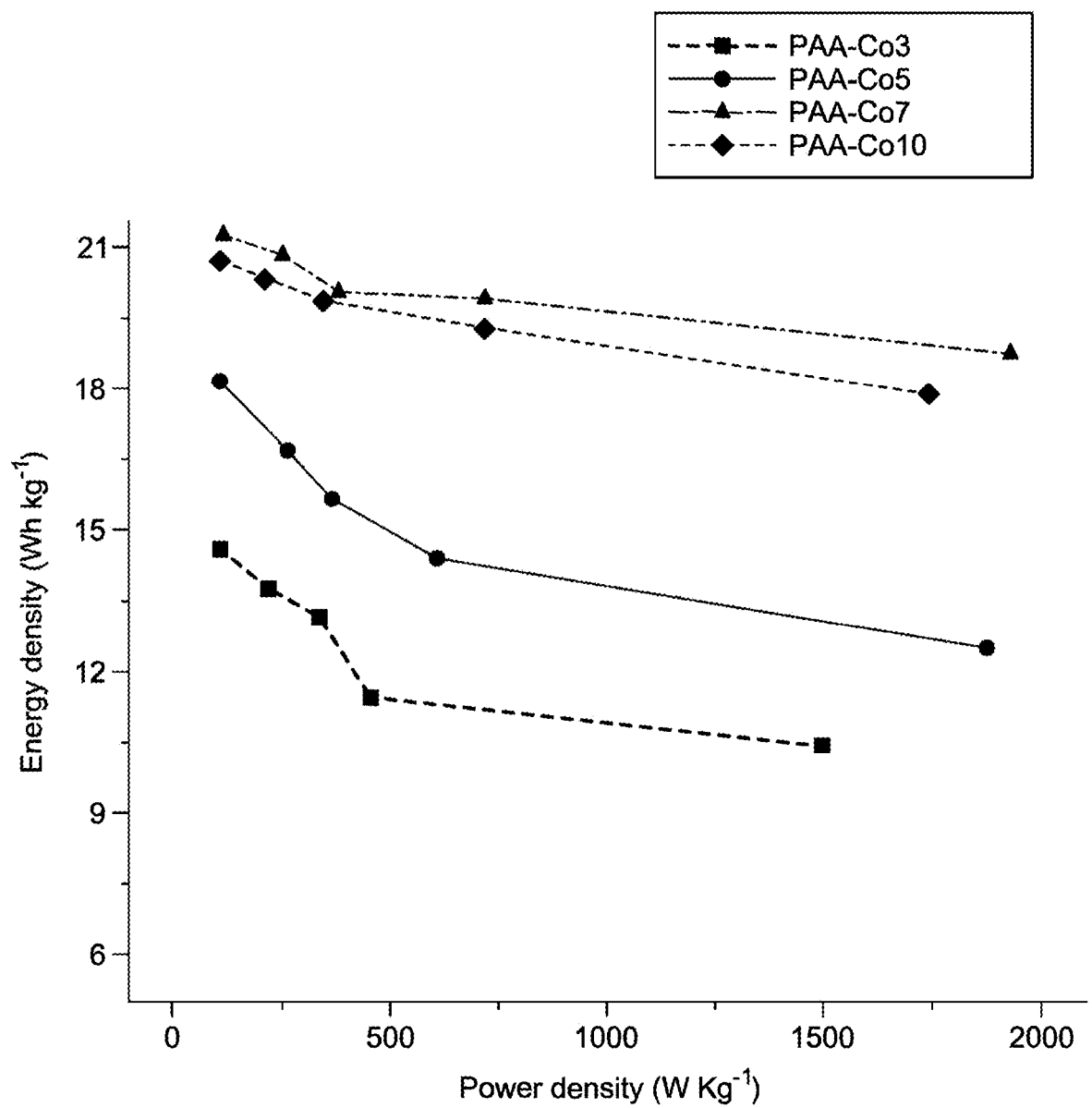
FIG. 6C shows Ragone plots of the PAA-CoX (X=3, 5, 7 and 10 wt %)

The ion transport property of EDLC is enhanced by the pseudocapacitive contribution of Co ions incorporated polymer structure. The $C_s$ values for the fabricated PAA-COX (X: 3, 5, 7, and 10) supercapacitors were calculated using Eq. (4), reached a maximum of Cs 230.12, 295.45, 336.89, and 341.33 $Fg^{-1}$ respectively, at a current density of 1 $Ag^{-1}$. These capacitances are remarkably higher than that of the pure PAA containing device has a C. of 21.25 $Fg^{-1}$ calculated using Eq. (3). Although the PAA-Co10 contains higher amounts of the cobalt ions, maximum C, was obtained from the device containing the PAA-Co7 at low current density. This is explained by the high chelating agent that causes aggregation (as seen in SEM images) in the electrolyte, and this limits the ion transfer rate.

$$E = \frac{i}{2w} \times C_s \times (\Delta V^2)/3.6 \quad (8)$$

$$P = E \times (3600/\Delta t) \quad (9)$$

where E is energy density, and P is power density. The symmetric supercapacitor with the PAA-Co7 has reached a maximum energy density of 21.25 Wh $kg^{-1}$ at the corresponding power density of 117.69 W $kg^{-1}$. A slight decreasing trend was observed in the energy density for the PAA-Co7 containing device at high discharge rates (10 mA) to 18.75 Wh kg-1 at a power of 1928 W $kg^{-1}$. This shows that the device provides high performance even at high discharge currents. (See FIG. 6C.)

Figure 6D:
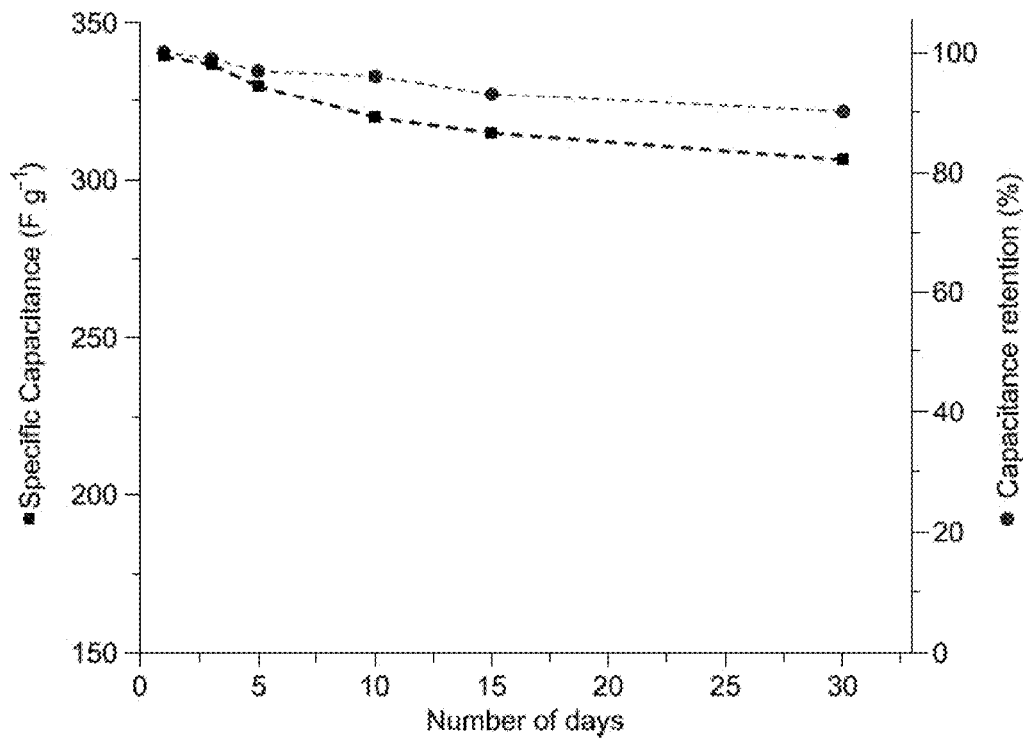
FIG. 6D shows capacitance retention versus number of days.
Figure 6E:
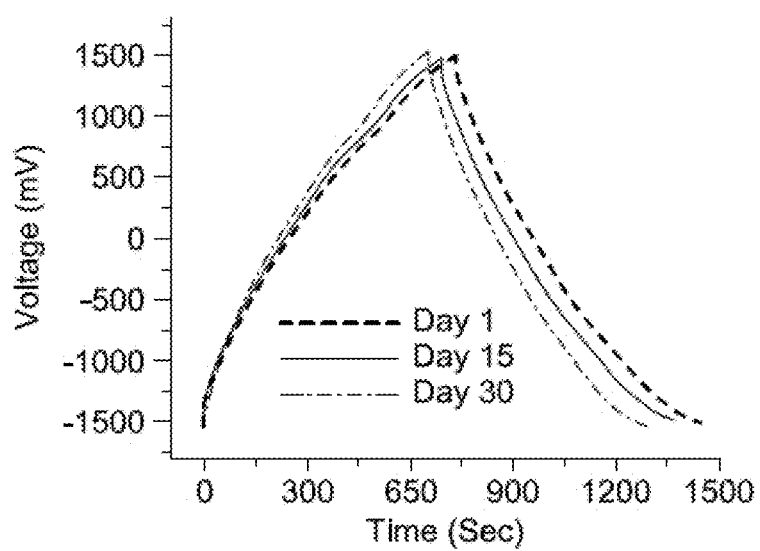
FIG. 6E shows the GCD profiles after the specified number of days.
Figure 6F:
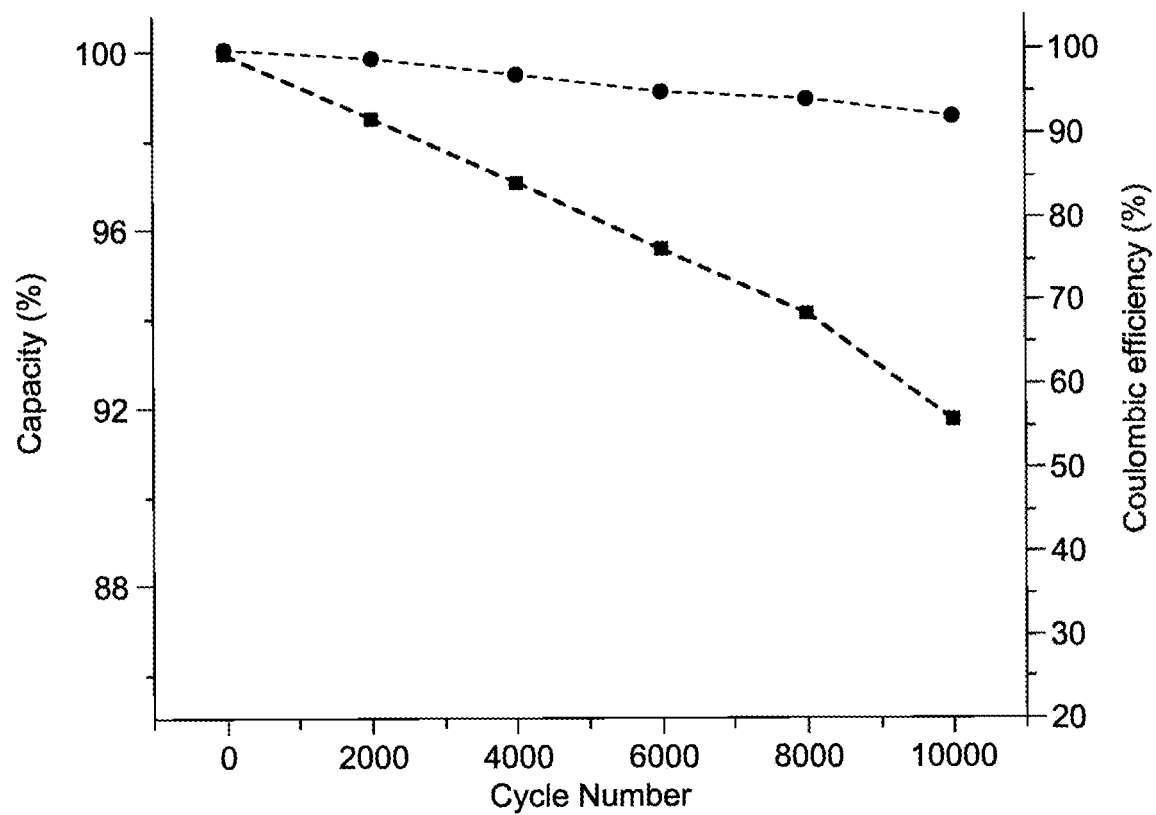
FIG. 6F shows specific capacitances and coulombic efficiency vs cycle numbers of the PAA-Co7 including supercapacitors.

Due to its effective performance the PAA-Co7 based device was employed in the cyclic durability tests. The $C_s$ retention was recorded as a function day for the PAA-Co7 based supercapacitor as shown in FIG. 6D. Notably, no rapid decline is observed in the C. of the cell after 30 days' time. FIG. 6E inset shown that the GCD profile maintains high performance even after 30 days, retaining 90% of its initial capacitance. The cyclic stability performance of the PAA-Co7 based device was tested by applying 10.000 GCD cycles at 1 $Ag^{-1}$ current density. The device showed stable behavior without rapid decrease at any period of the stability tests with losing 7.3% of its initial performance after 10,000 cycles. In addition, a remarkable coulombic efficiency of the device was recorded around 92% when it reached about 10,000 cycles illustrated in FIG. 6F.

The redox activated polychelates (PAA-CoX) is cost effective and has excellent physical properties such as flexibility and high ionic conductivity. These electrolytes were successfully used to assemble flexible supercapacitors with high capacitance retention of 90% up to 10,000 cycles. The fabricated supercapacitors also have cycle robustness up on bending at various angles. The device with PAA-Co7 has provided the best performance as compared to other compositions and provided a specific capacitance of 341.33 $Fg^{-1}$. Interestingly, the device stably showing considerably higher gravimetric energy density of 21.25 Wh $kg^{-1}$ at the corresponding power density of 117.69 W $kg^{-1}$. The device with a dimension of 1.5 cm×3 cm including an optimized PAA-Co7 has successfully operated the RGB LED light charged to 3 V for 10 min. A facile method was employed to provide the redox active polychelates that provide new insights into the development of practical and highly effective, low-cost electrolytes for applications in flexible energy devices.

Numerous modifications and variations of the present invention are possible in light of the above teachings. It is therefore to be understood that within the scope of the appended claims, the invention may be practiced otherwise than as specifically described herein.

The invention claimed is:

1. A cyclically chargeable flexible supercapacitor battery, comprising:
    a flexible electrode cell assembly comprising:
        a pair of electrodes, including a metal foil current collector and a carbon composite electrode, separated by a redox-active polymer hydrogel electrolyte, the redox-active polymer hydrogel electrolyte comprising:
        a polymer hydrogel,
        redox-active transition metal cations which are at least one selected from the group consisting of vanadium, chromium, manganese, cobalt, and copper, and
        charge balancing anions;
    wherein the flexible electrode cell assembly retains greater than 75% of an unbent energy storage capacity when bent at an angle of 10 to 170°,
    wherein the flexible electrode cell assembly has a specific capacitance of 300 to 380 F/g.

2. The cyclically chargeable flexible supercapacitor battery of claim 1, wherein the polymer hydrogel is a polyacrylic acid hydrogel.

3. The cyclically chargeable flexible supercapacitor battery of claim 2, wherein polyacrylic acid is present in the polyacrylic acid hydrogel in an amount of 2.5 to 50 wt. %, based on a total weight of polyacrylic acid hydrogel.

4. The cyclically chargeable flexible supercapacitor battery of claim 1, wherein the redox-active transition metal cations are cobalt (II) ions.

5. The cyclically chargeable flexible supercapacitor battery of claim 1, wherein the redox-active transition metal ions are present in an amount of 0.1 to 15 wt. %, based on a total weight of the redox-active polymer hydrogel electrolyte.

6. The cyclically chargeable flexible supercapacitor battery of claim 1, wherein the redox-active polymer hydrogel electrolyte is substantially free of iron.

7. The cyclically chargeable flexible supercapacitor battery of claim 1, wherein the charge balancing anions are selected from the group consisting of hydroxide anions, halide anions, sulfate anions, nitrate anions, perchlorate anions, tetrafluoroborate anions, difluoro (oxalato) borate anions, hexafluorophosphate anions, and bis (trifluoromethanesulfonyl) imide anions.

8. The cyclically chargeable flexible supercapacitor battery of claim 1, wherein the charge balancing anions are sulfate anions.

9. The cyclically chargeable flexible supercapacitor battery of claim 1, wherein the charge balancing anions are present in an amount of 0.1 to 15 wt. %, based on a total weight of redox-active polymer hydrogel electrolyte.

10. The cyclically chargeable flexible supercapacitor battery of claim 1, wherein the redox-active polymer hydrogel electrolyte has an ionic conductivity of $1.00 \times 10^{-5}$ to $1.00 \times 10^{-3}$ $Scm^{-1}$.

\* \* \* \* \*